INVENTORS
SAMUEL KAUFMAN
JOSEPH J. MAGNINO, JR.
BY
ATTORNEY

Oct. 31, 1967  S. KAUFMAN ET AL  3,350,695
INFORMATION RETRIEVAL SYSTEM AND METHOD
Filed Dec. 8, 1964  16 Sheets-Sheet 2

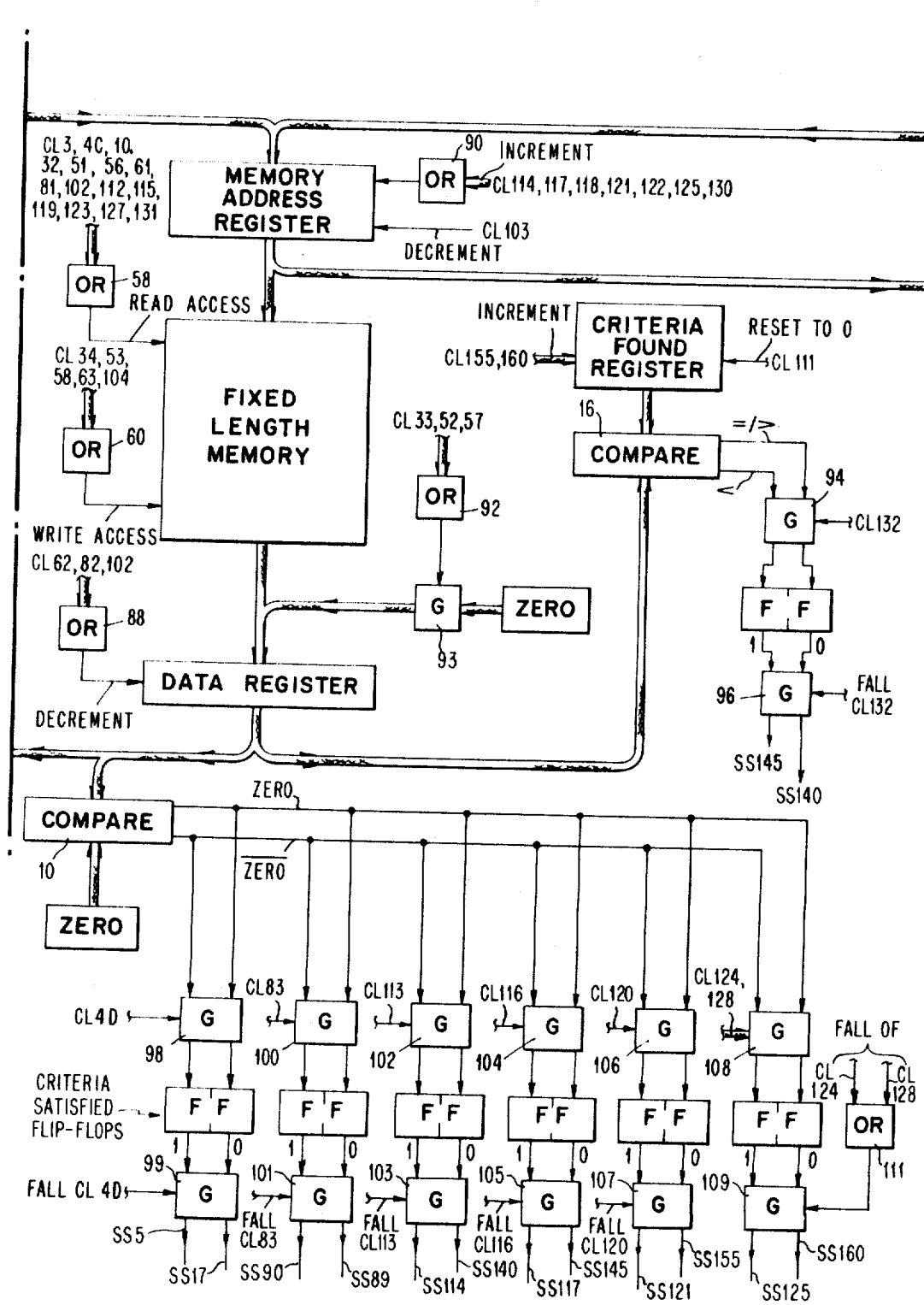

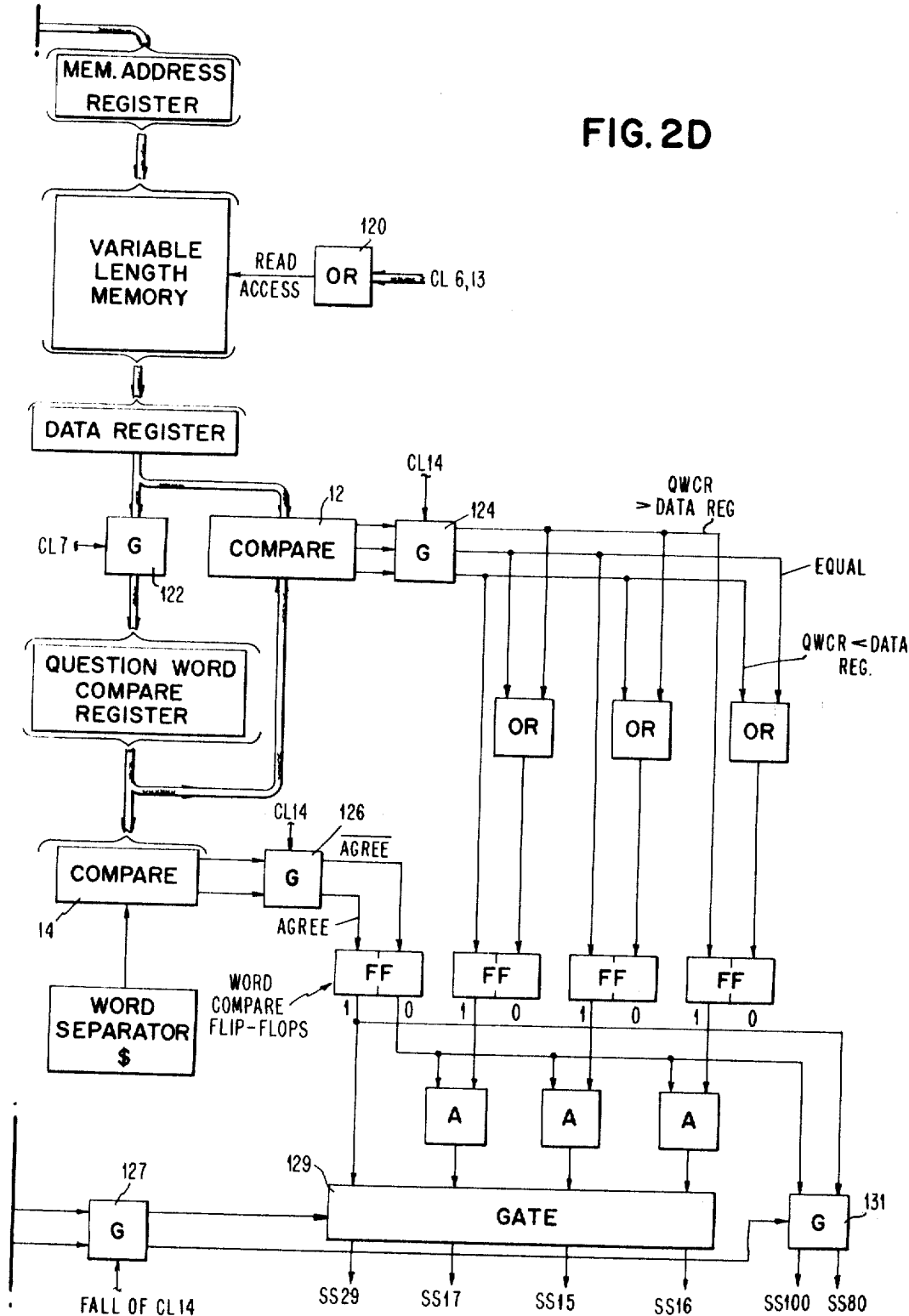

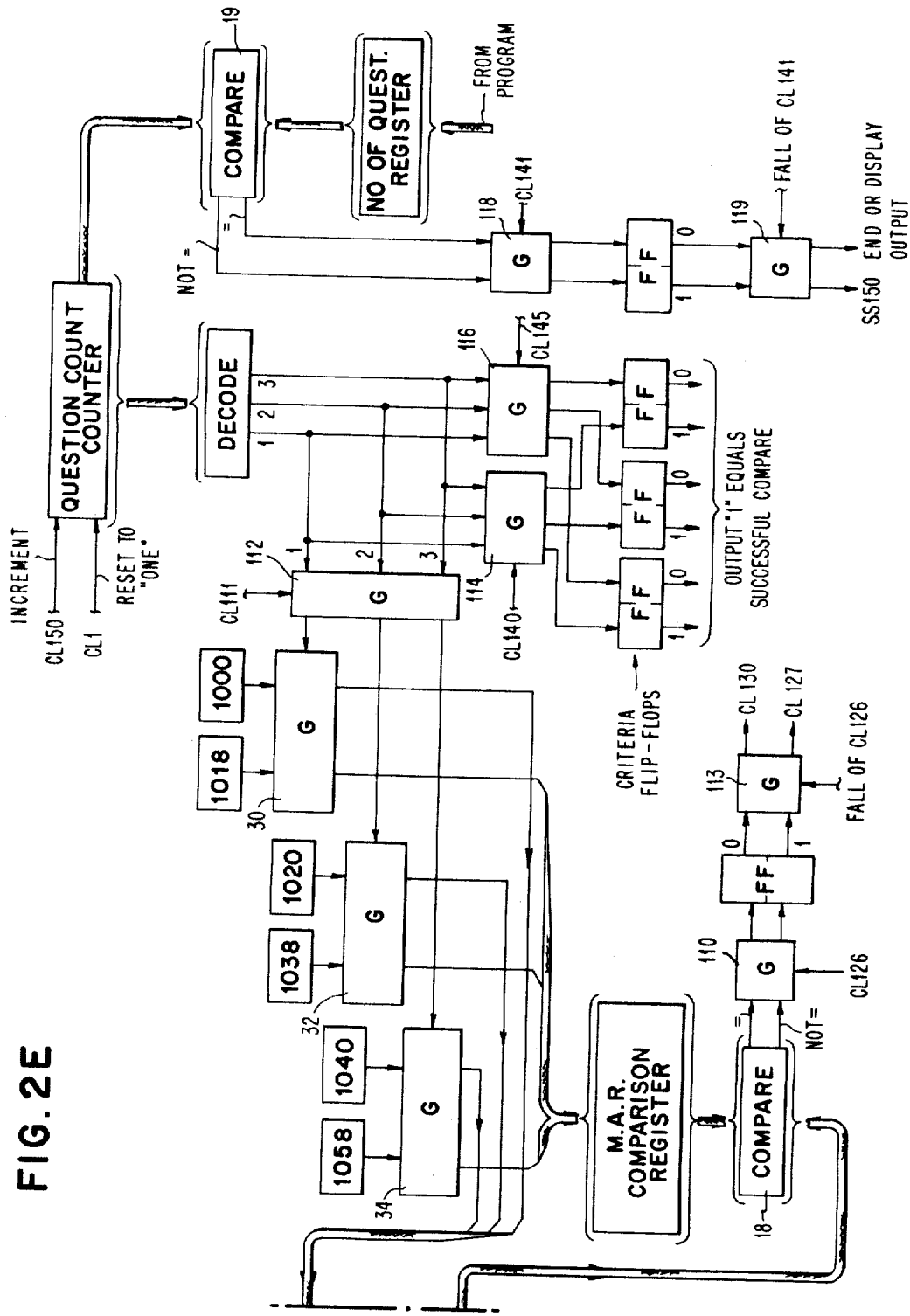

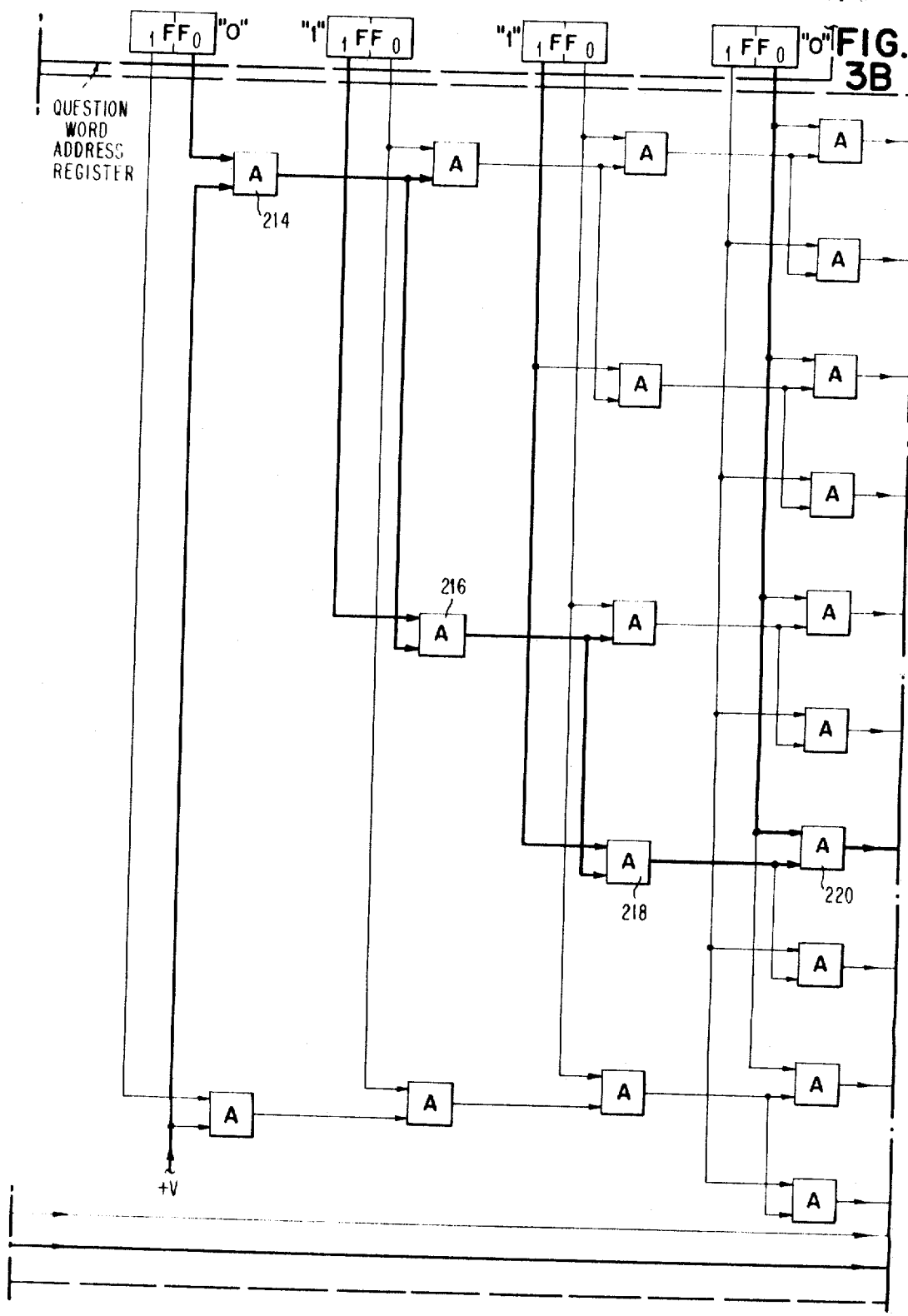

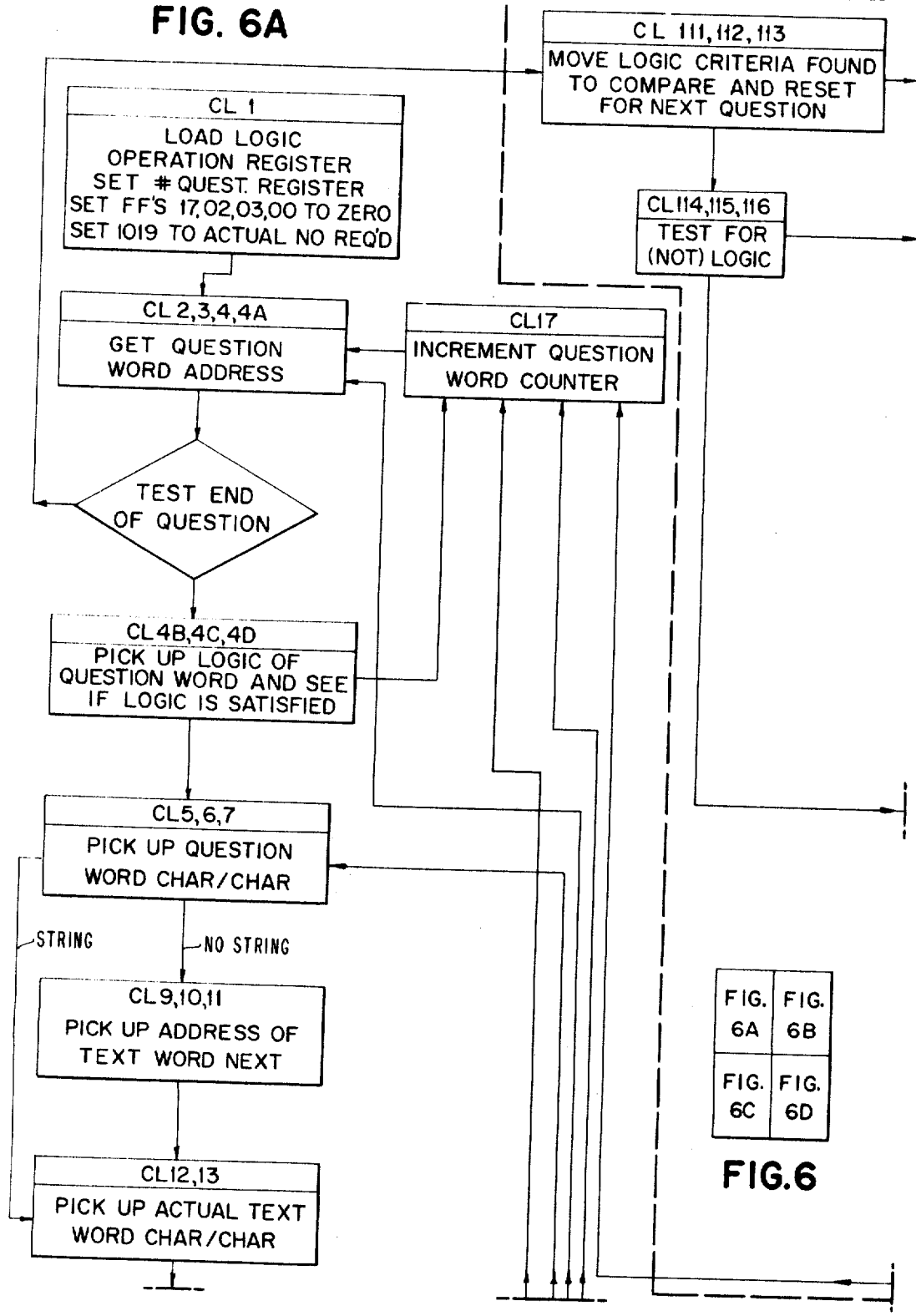

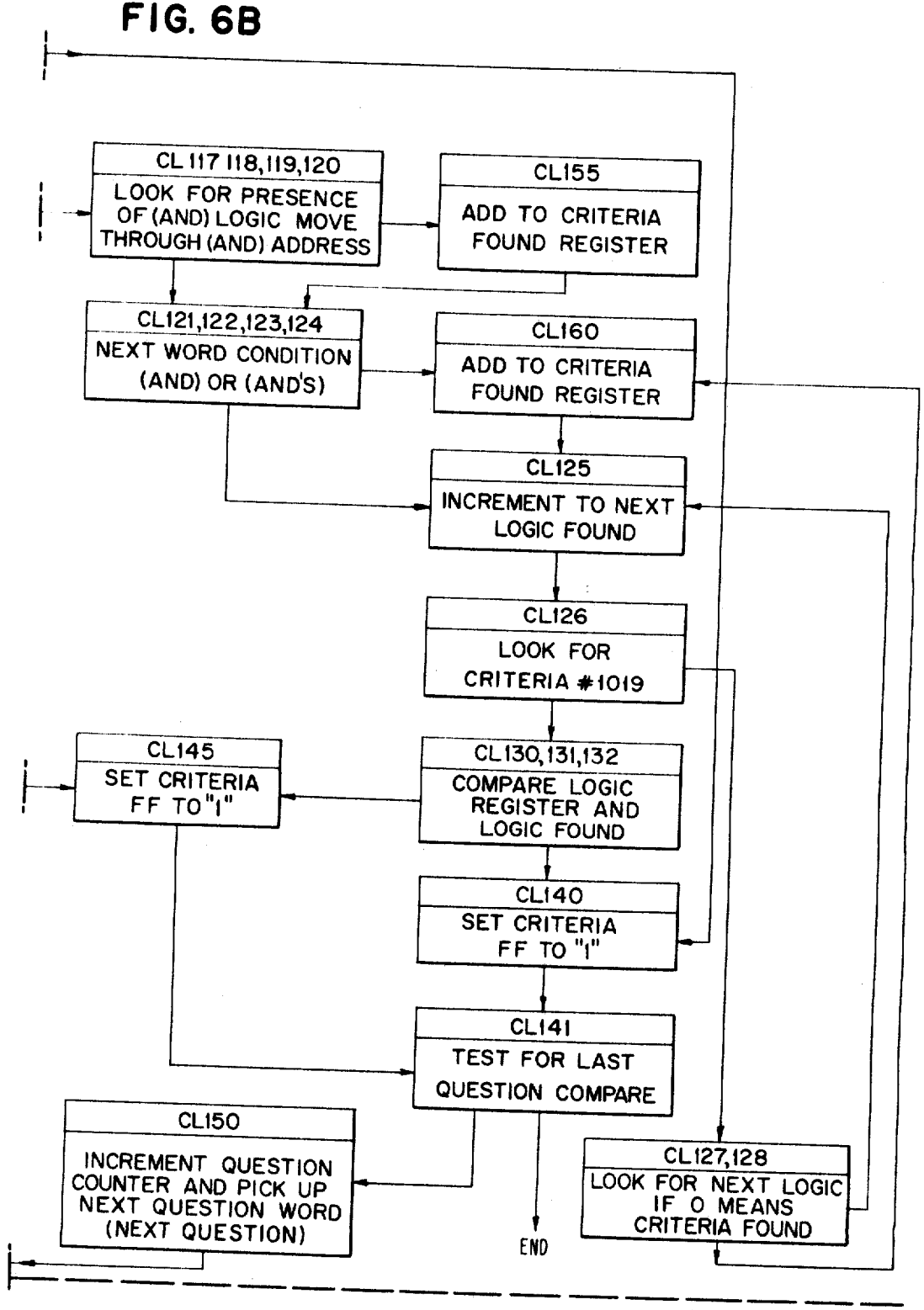

United States Patent Office 3,350,695
Patented Oct. 31, 1967

3,350,695
INFORMATION RETRIEVAL SYSTEM
AND METHOD
Samuel Kaufman, New York, and Joseph J. Magnino, Jr., Yorktown Heights, N.Y., assignors to International Business Machines Corporation, New York, N.Y., a corporation of New York
Filed Dec. 8, 1964, Ser. No. 416,719
24 Claims. (Cl. 340—172.5)

ABSTRACT OF THE DISCLOSURE

An information retrieval system is disclosed wherein the information is initially input to the system in normal English language text form and questions are posed to the system in the same normal text form where appropriate. The data base or body of information to be searched is organized in essentially two separate formats in system memory, i.e., an alphabetized portion wherein the alphabetization is accomplished according to word length and secondly an unalphabetized portion wherein the individual words of the data base are accessable in their normal order. Means are provided for searching for individual words in the data base and also word strings which comprise two or more words in their normal sequential order. Allowable questioning techniques include means for searching the data base with groups of question words wherein conventional and, or, not, etc. logic possibilities exist.

---

Figure 1:
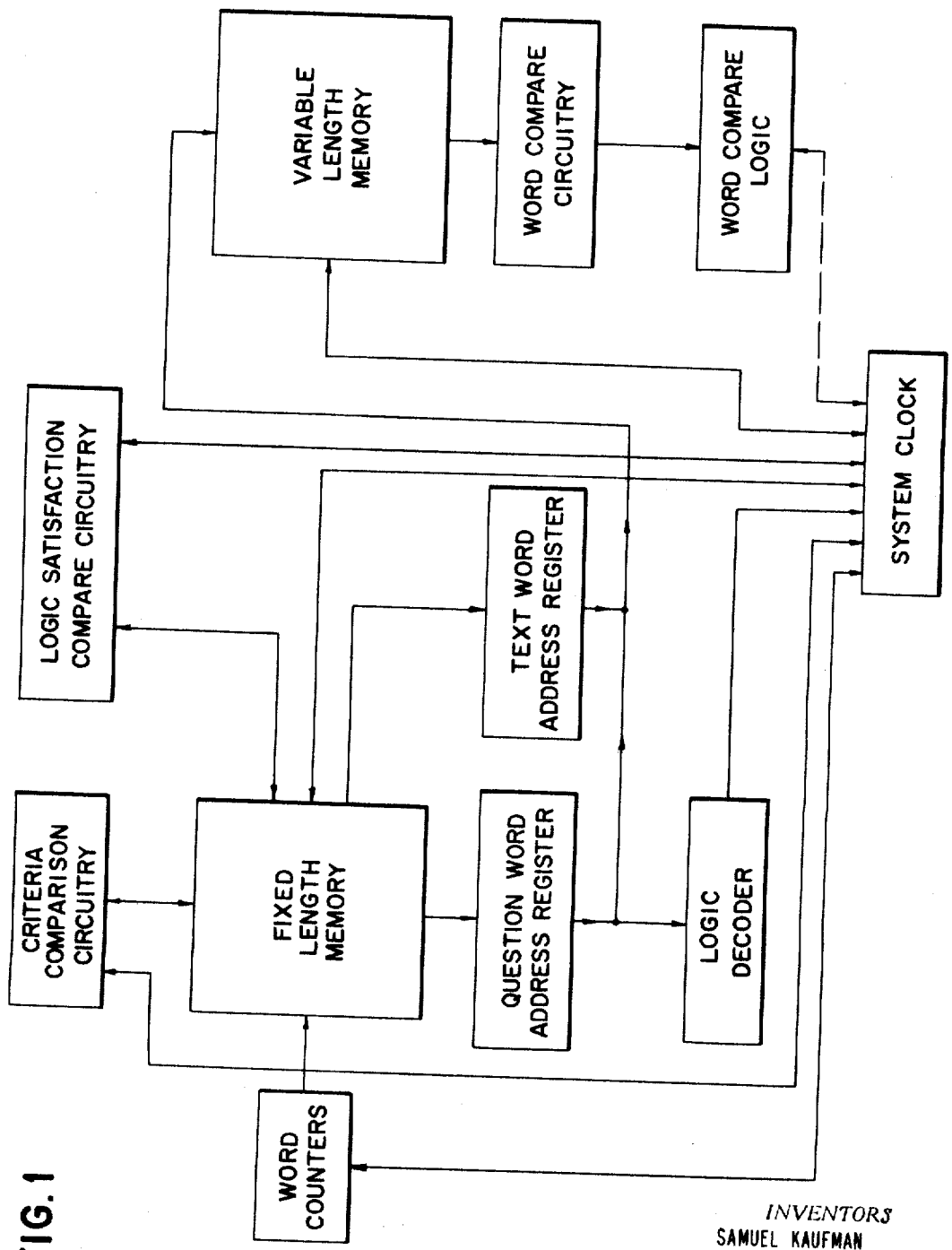

The present invention relates to a method and apparatus for automatically searching extremely large quantities of raw data and examining same for content based on questions asked about said data. More particularly it relates to such an apparatus and method for searching a full normal text data base utilizing standard English text question words.

In recent years a phenomenon which has been often referred to as the information explosion has occurred in most civilized countries. In many fields of endeavor the volume of published material relative to various subjects in these fields have increased by orders of a hundredfold. Technical and trade publications containing many articles and much information which is very valuable to practitioners in the particular field which these publications refer often lies useless in various libraries purely for the lack of availability or accessibility of such articles. In the scientific area, for example, there are hundreds of different recognized technical publications each of which may contain up to fifty articles on various scientific subjects based in many cases upon studies and experiments performed by outstanding scientists in the field. It is obviously wasteful of both time and money for subsequent experimenters in such fields to reproduce experiments which have been exhaustively studied previously. However, due to the aforementioned lack of availability or accessibility of many published articles subsequent experimenters assume that work in their particular field has never been done before, thus needlessly duplicating experiments and using time which could otherwise be valuably spent elsewhere.

The field of legal research is a similar pressing one wherein for a practicing attorney to adequately know how to prepare his case for trial, he must of necessity search many many thousands of prior cases to determine or attempt to determine fact situations, legal precedents, etc., which apply to the particular case at hand. As is well known, legal libraries have been compiling volumes of printed cases practically since the beginning of our Government and every year the volume of these cases continually increases, thus presenting an ever increasing Information Retrieval problem.

Accordingly, many, many people are beginning to turn serious attention to the problems of Information Retrieval and in particular, people in the electronic data processing industry are seeking ways to utilize what are essentially electronic data processing machinery to perform Information Retrieval tasks. A number of different Information Retrieval systems have been developed in the past, among these are such systems utilizing key wording, auto-abstracting, complete concordance matching and many others. The aforementioned key wording concept requires a human being having rather broad knowledge in an area to read certain articles or text material to be made part of the Information Retrieval base and to key word this information, thus for a given paragraph, four or five words might be listed which would in the reviewer's mind indicate the general context of the paragraph or articles. Obviously, the accuracy of such key wording requires great imagination on the part of the reviewer and subsequent imagination and commonness of thought as to which key words a person asking questions of this key worded list would use in order to obtain a reasonably accurate retrieval of information based on key words. Thus, although the key wording concept greatly reduces data base, it severely limits the flexibility of the system and automatically introduces great subjectivity due to the high degree of human intervention necessary both in preparing a data base and in preparing questions.

Another similar concept requiring considerable human intervention is abstracting which, as implied, requires a human operator to review an article and greatly reduce the quantity of words in the original articles and from an article of many pages produce a highly condensed descriptive paragraph. As with the key wording concept, this introduces great subjectivity in the resulting data base and severely limits the retrieval of information since a subsequent questioner must be thinking along very similar lines to the person who prepared the abstract of the particular article.

A third Information Retrieval system being currently used involves the use of a partial text, i.e., some common words removed; however, the entire text is alphabetized and a complicated address indication of the alphabetized word in the original text is carried with the word in the alphabetized format. This is done so that subsequent searching and word adjacency tests may be made to determine the existence of words and word STRINGS as will be set forth subsequently in the description of the present invention. Further, with this latter system an entire data base is completely alphabetized in addition to the relative addresses of a word in a data base and index or reference of some sort to the particular batch or piece of data, publication, etc., from which the particular word was taken must be included in the data base. Subsequent to all the matching operations with question words, a very large amount of bookkeeping and interrogation of answers must follow to see what word matches come from single data sources, etc. The handling of word STRINGS and word adjacency situations is especially difficult with the above system.

The key wording and abstracting systems outlined previously normally use an inverted file system very much like the full alphabetization scheme outlined previously. Thus, it will be seen that Information Retrieval systems utilizing human condensation or reduction of the data base together with current outmoded Information Retrieval searching schemes suffer from the disadvantage of the considerable possibility of human error plus very cumbersome searching techniques.

A further technique utilizing the concept of data reduction is referred to as auto-abstracting wherein a computer scans data and discards irrelevant words. A very simplified example of this would be the discarding of articles and perhaps very common verbs whose location and meaning would be clearly implied. However, it is to be, of course, understood that most auto-abstracting techniques go well beyond this very obvious method of reducing the data base and often will condense a given segment of data by well over 50 percent. It will be obvious that interrogation of said reduced data will require considerable knowledge of the manner in which the data was reduced. Further, any shortcomings insofar as loss of information due to data reduction in certain schemes in certain instances will obviously cause the results of any search made on such a machine reduced data base to suffer accordingly.

From the above discussion it will be apparent that the optimum Information Retrieval system insofar as obtaining a maximum amount of information and avoiding errors due to loss of data because of any sort of data reduction scheme are best avoided by utilizing the complete data base for interrogation purposes. Further, utilizing such a data base allows for maximum flexibility of questions and any untrained person would be capable of asking questions of such a data base and would in all probability be able to phrase questions which would provide a read out at least comparable to that which he would obtain by manually going through the data in a printed format.

It has now been found that an Information Retrieval system is possible utilizing a full normal text English data base format and questions may be asked of this data base using very straightforward questioning techniques. Further, this system provides for very powerful logic capabilities and the searching of long word STRINGS and word adjacency pairs in a far more efficient manner than has heretofore been available in the art.

It is accordingly a primary object of the present invention to provide a vastly improved Information Retrieval system using electronic data processing techniques and apparatus.

It is a further object to provide such a system which is designed to work with a data base in normal text form whether English or a foreign language.

It is a further object of the invention to provide a method for pre-processing a data base for optimum utilization in an Information Retrieval system.

It is yet another object of the invention to provide a method and apparatus for searching alpha-numeric data and making word comparisons based on word lengths as well as alphabetical matching.

It is another object of the invention to provide such method and apparatus including broad logic capabilities in performing search operations.

It is still another object of the invention to provide a method and apparatus for efficiently performing a word STRING search in an Information Retrieval system.

The foregoing and other objects, features and advantages of the invention will be apparent from the following more particular description of preferred embodiments of the invention, as illustrated in the accompanying drawings.

Figure 2A:
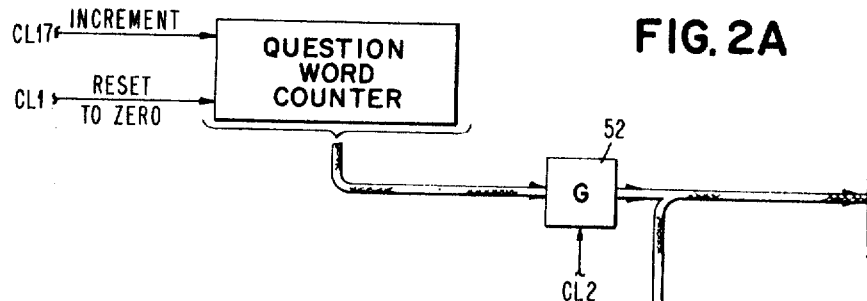
Figure 2A:
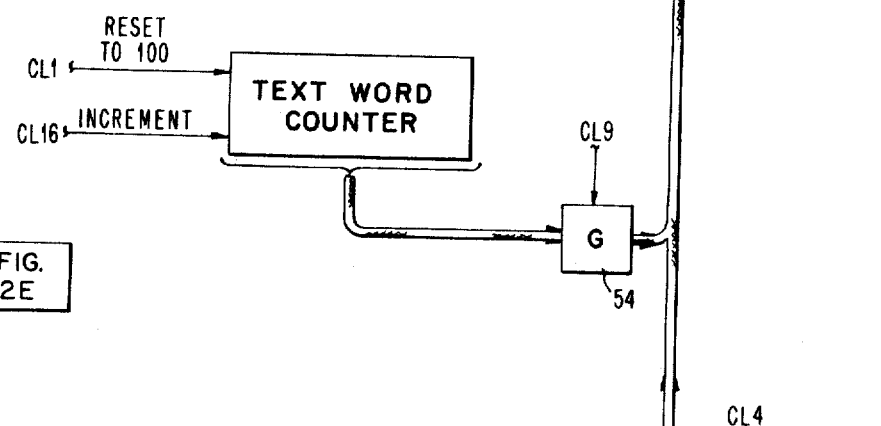
Figure 2:
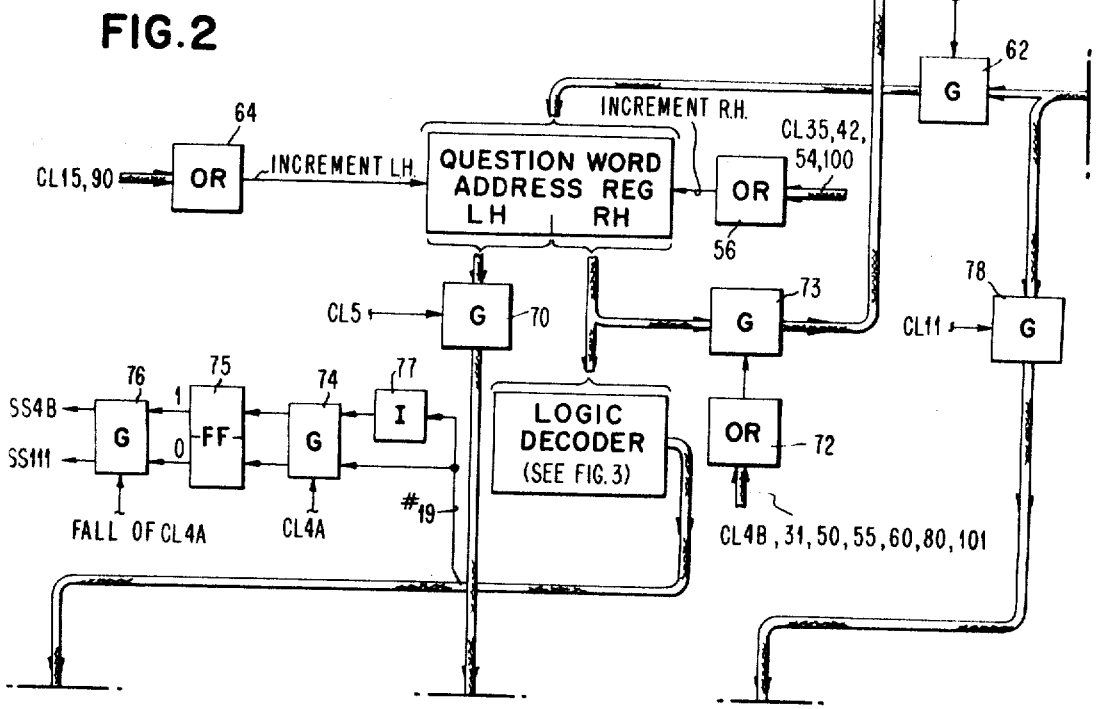

In the drawings:

FIGURE 1 is a functional block diagram of the disclosed embodiment of the system disclosed in FIGURE 2.

FIGURES 2 through 2E comprise a composite logical schematic diagram of a possible embodiment of an Information Retrieval system constructed in accordance with the general teachings of the present invention.

Figure 3A:
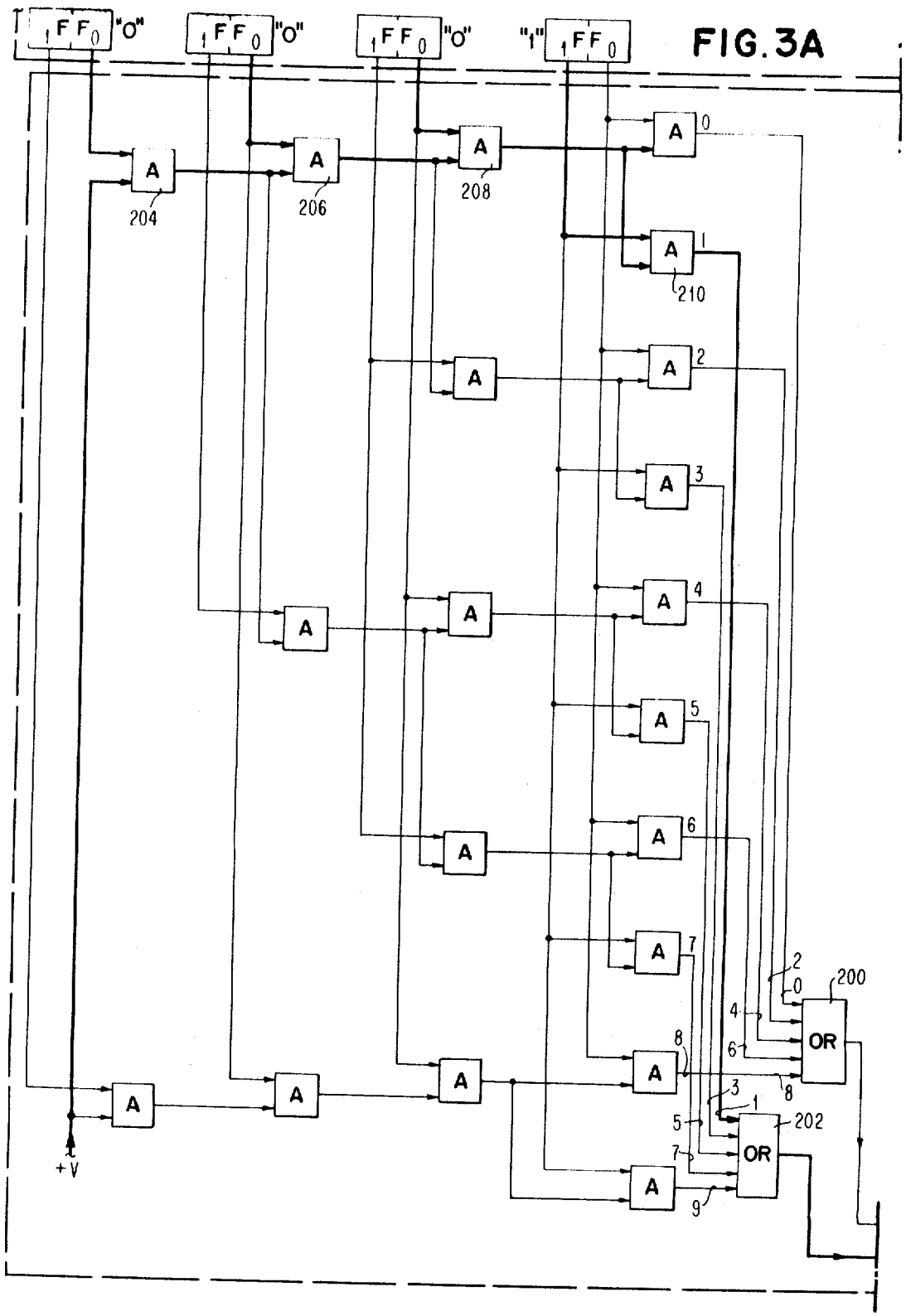
Figure 3C:
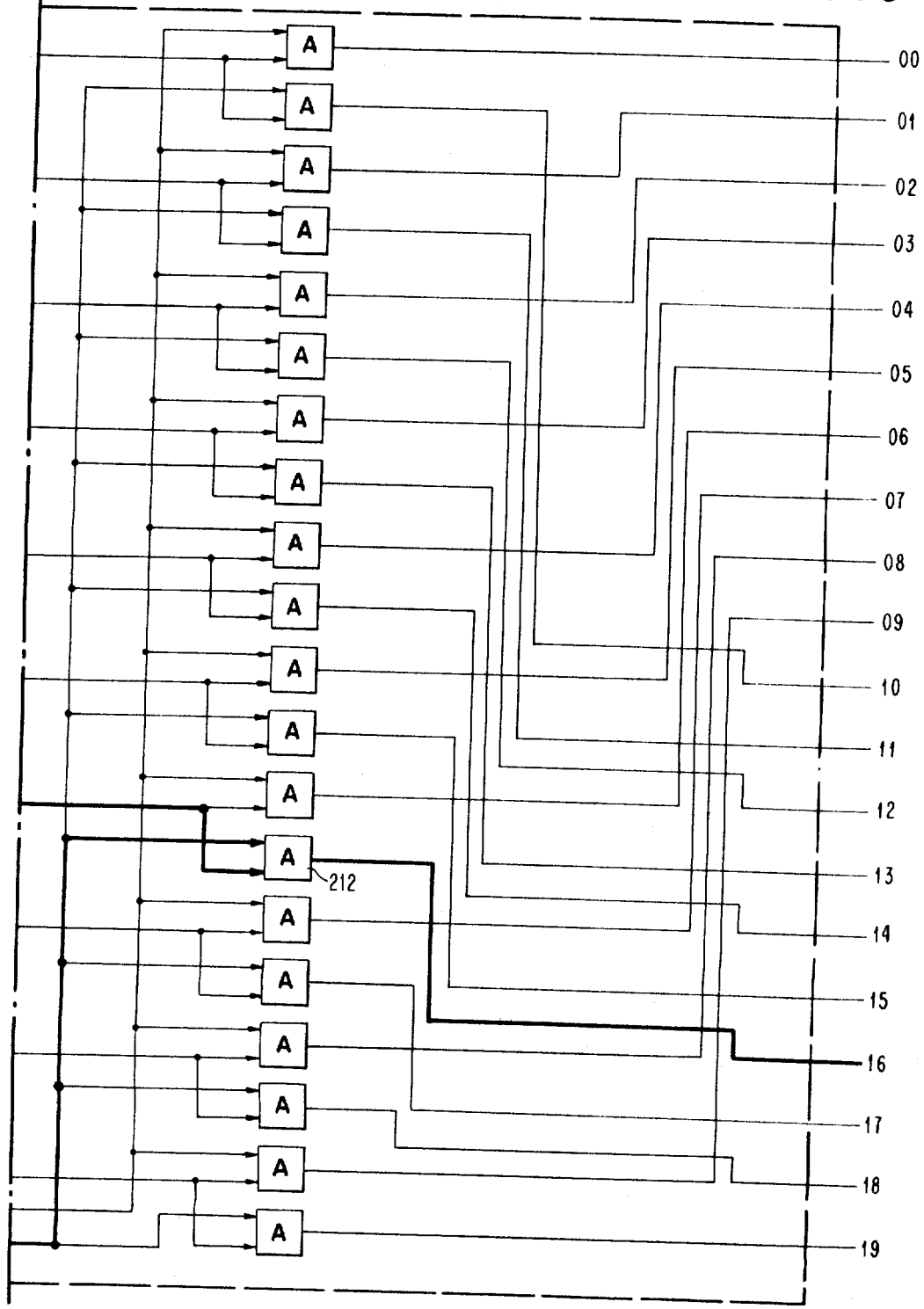

FIGURES 3 through 3C comprise a composite logical schematic diagram of the Logical Decoder shown in FIGURE 2A.

Figure 4A:
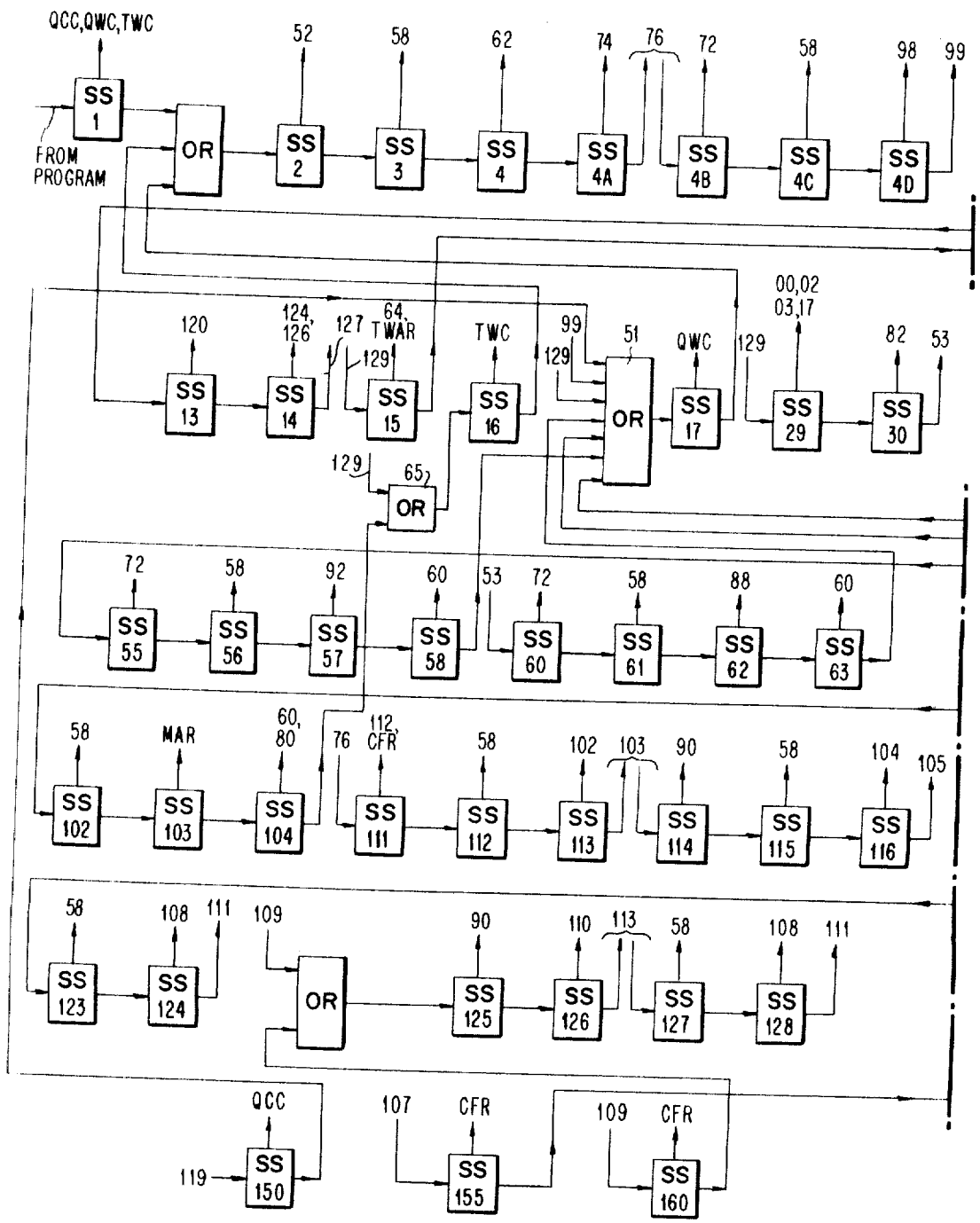
Figure 4B:
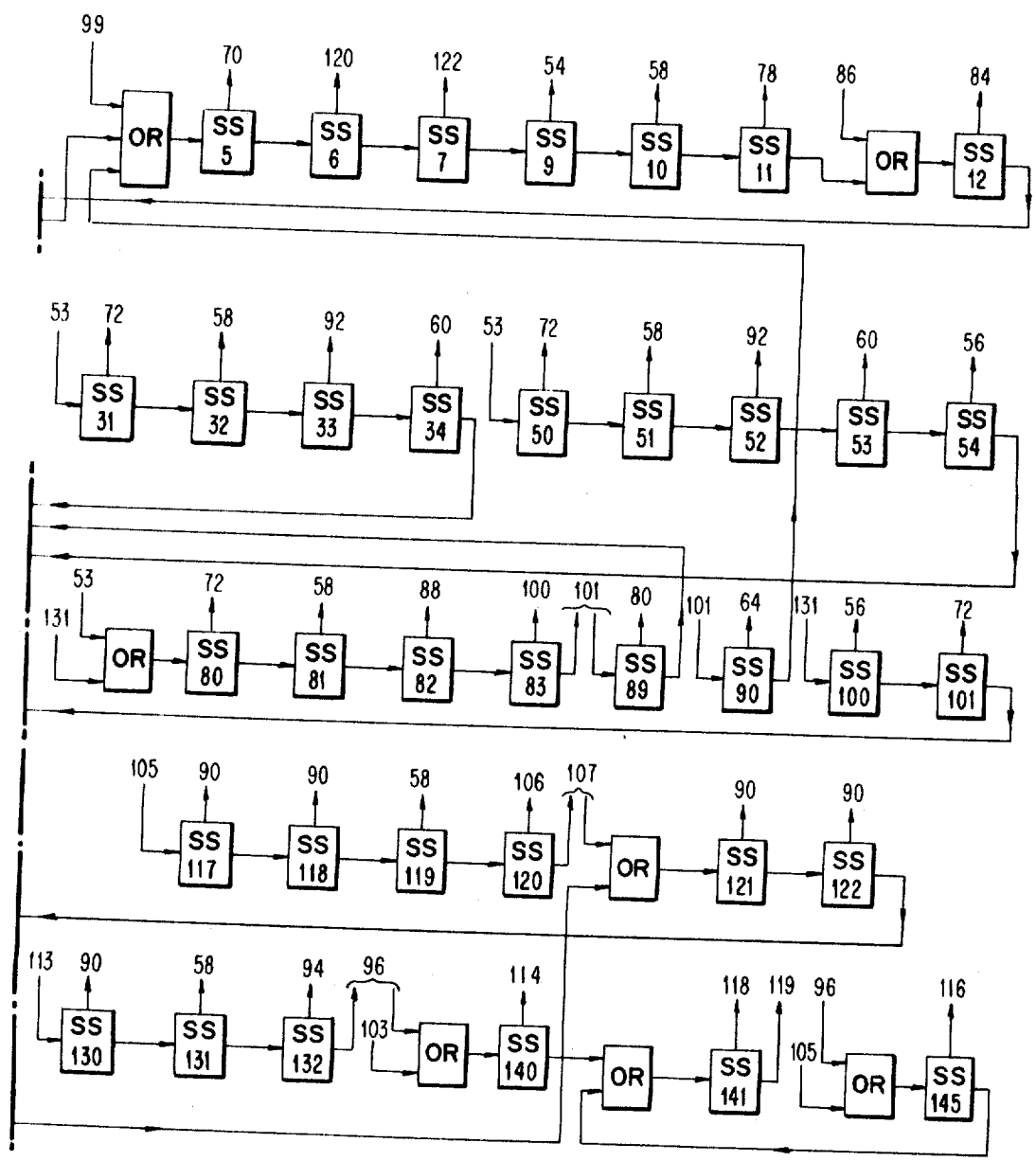

FIGURES 4 through 4B comprise a composite logical schematic diagram of the System Clock utilized to perform all of the timing and control functions of the Information Retrieval system embodiment illustrated in FIGURES 2A through 2E.

Figure 5:
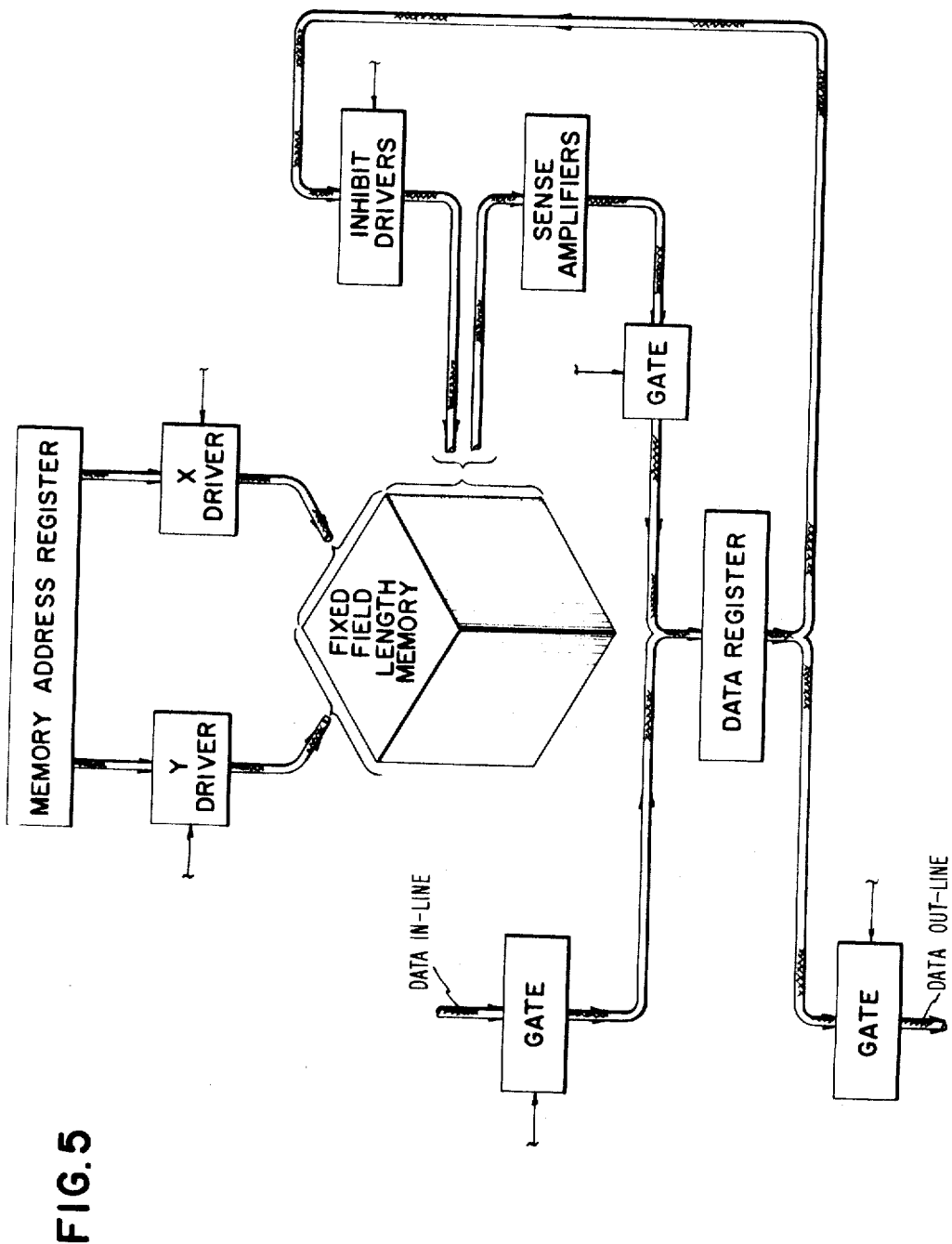
Figure 6C:
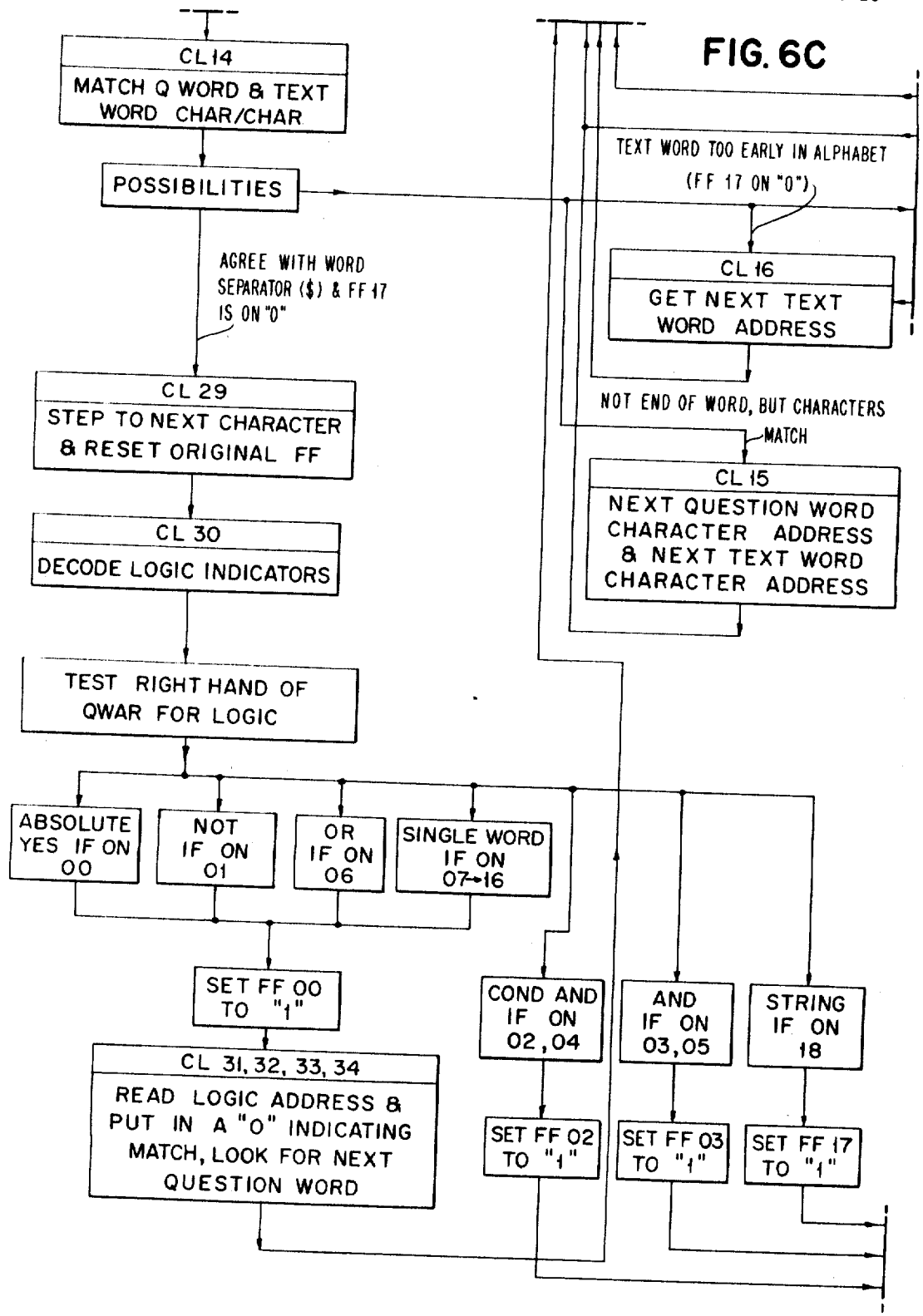
Figure 6D:
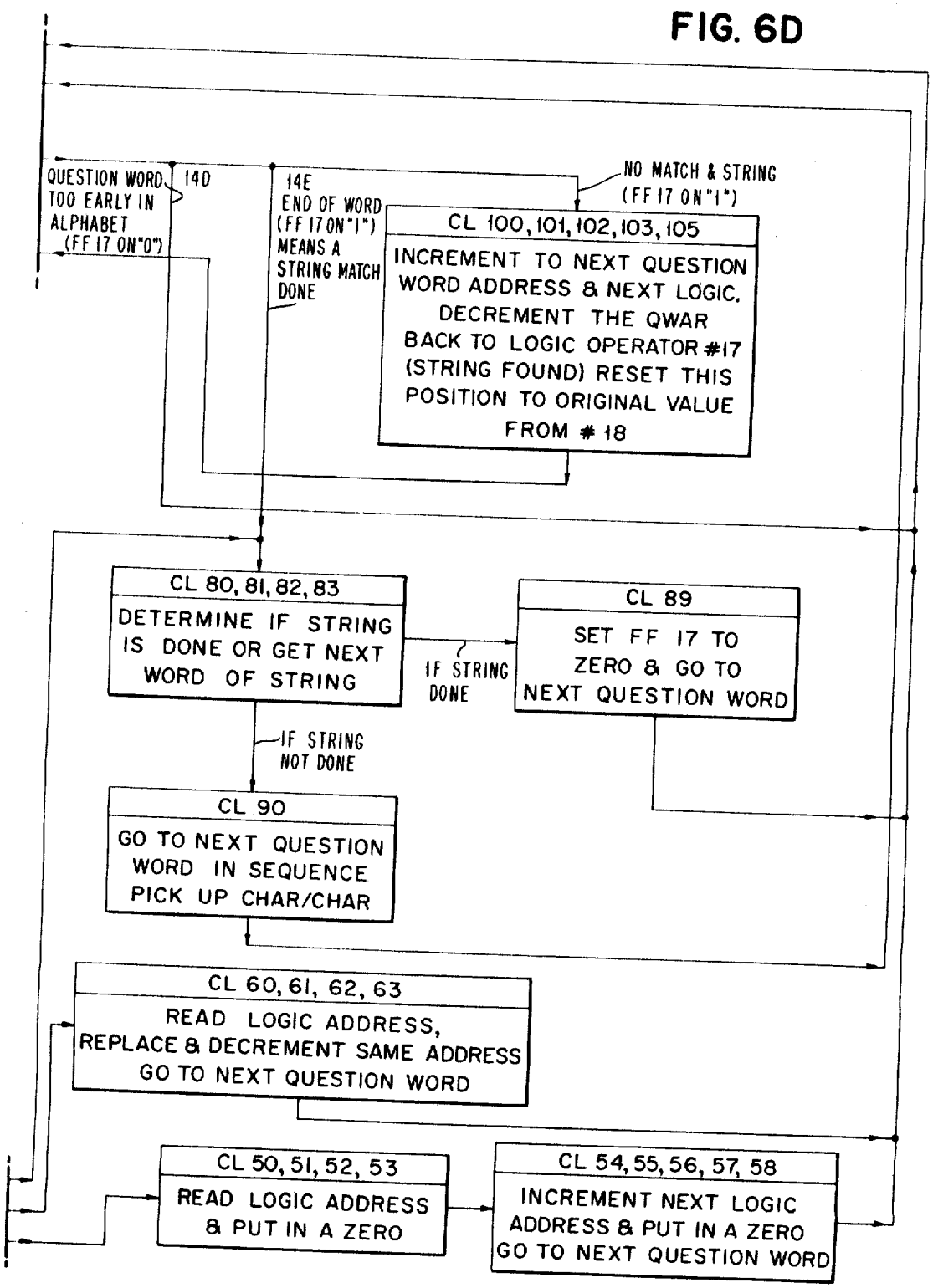

FIGURE 5 is a functional block diagram of a typical random access magnetic memory such as would specifically be used as the Fixed Length Memory illustrated in the FIGURE 2C; and FIGURES 6 through 6D are a composite flow diagram of the operation of the Information Retrieval system embodied in FIGURES 2A through 2E.

The objects of the present invention are accomplished in general by a method of performing normal text Information Retrieval operations which method comprises first preparing the data base by determining the relative address of every word within a given data base, said data base being arranged in normal text format, storing the normal text format data base in a first machine storage location, every word of said data base being separately addressable, alphabetizing the data base words together with their relative addresses, and discarding all but the relative addresses of the words and storing same in sequential order in a second machine storage location. The questions are prepared by first preparing a list of question words including their relative addresses and a special logic operation indicator and storing the question words in their normal text format in a third machine storage location. Next, the question words are alphabetized together with the logic operation indicators associated with each word and subsequently, the word is discarded and the alphabetized list of relative addresses together with the appropriate operation indicator is stored in a fourth machine storage location. Next, the searching operation is performed utilizing the alphabetized list of relative addresses of both the question word list and data base word list and said addresses are utilized to access the actual words stored in memory. Whenever a match is found for a question word, the logic operation indicator for that question word is examined and an indication of the match is stored at a machine storage location directly related to said operation indicator. The search is continued until all question words have been accessed and compared against the data base. At the conclusion of a search, all of the match found indications for each complete question are examined and a determination made as to whether the desired number of logical matches for a given question has been satisfied by this search.

According to a further aspect of the invention, word STRINGS in a question may be very conveniently searched by transferring the data base accessing control from the alphabetized relative address list of data base words to an indexing counter so that beginning with the first word of a desired STRING located in the normal text data base portion of said machine storage consecutive data base words may be gated out of said machine storage and compared against the question STRING and a very rapid determination of whether such STRING exists in the data base may be made. In this case, the first word of the STRING being sought is alphabetized in the question word list and the special logic operation indicator will indicate that a word STRING is being sought and control suitably shifted to accomplish this search operation.

Other question logic operations are suitably indicated by the special logic operation indicators or numbers so that, for example, AND's, OR's, ABSOLUTE YES, NOT's, etc., may readily be searched for and the success or failure of said logical operation in the search suitably noted in memory, said results being obtainable at the end of a search.

An additional feature of the present Information Retrieval system is that whereby both question words and data base words are characterized by word length indicators. That is, a special word length symbol or number is carried at a predetermined location with respect to each word which indicates the length of said word. Thus, as the alphabetizing is performed, words are first grouped into groups of ascending length and then alphabetized, that is, all single character words are alphabetized, all words having two characters, all words having three character, etc. Special recognition and control circuitry is then utilized in the Word Comparison Unit of the system so that when a given word is being looked for, if a data base word is brought out which is too short, the system control will be told that this word is of a different length than the one being looked for and thus, could not possibly result in a successful match. The system provides for automatically continuing access of data base words until words of the proper length are found. Conversely, if the first question word is shorter than the first data word encountered, the subsequent question words will be accessed until a question word of equal or greater length is found.

Once in the proper alphabet, i.e., proper word length, searches for the proper alphabetic matches continue in a similar manner. Thus, assuming that the first three words in a particular data base word and a question word match, when the fourth character is analyzed, it will be found that the letter, for example, "M," in the question word is further up in the alphabet than, for example, an "H," in the data base word. Thus, the next data base word will automatically be accessed on the occurrence of the mismatch. The converse is also true, so that if the letter in the data base word is further along in the alphabet than the question word, the next question word would be accessed.

This type of word length alphabetizing greatly reduces searching time and thus, the cost per search which as is apparent is of paramount importance in such systems.

From the above very general description of the present system it may be seen that the complete Information Retrieval process occurs in three distinct steps. The first is the preparation of the data base itself which, as stated previously, comprises assigning relative addresses to each word in the data base, said data base being organized in its original or normal text format. Secondly, the data base is alphabetized carrying the relative address for each word with that word during the alphabetizing routine. Next, the actual word itself is deleted and only the alphabetized list of relative addresses is kept. Thus, using the alphabetized list of relative addresses, the data base words in normal text form stored somewhere in machine memory may be accessed in alphabetical order. Thus, it may be seen that subsequent to the preparation of the data base, there will be two distinct batches of information for each data base. The first is the list of words in their normal text sequence and second, the list of alphabetized relative addresses. As will be explained more fully subsequently, these two batches or segments of the data base are stored in the machine memory at two distinct locations. In the embodiment of the invention set forth in FIGURES 2A through 2E, the two batches of the data base are actually stored in different memories in order to achieve maximum memory utilization.

The second distinct operation is the preparation of questions to be asked of a given data base or plurality of data bases since each question set may be continuously repeated against a plurality of different and distinct data bases as will be also clearly described subsequently.

The first step in preparing the question list comprises assembling the question. AND's and OR's which are equivalent will normally be grouped together, NOT's and ABSOLUTE YES's could also be grouped together and single words listed consecutively. The only area wherein the normal text arrangement of the question must be maintained is in the word STRING wherein it is desired to find a particular STRING of two or more words such as "to be or not to be." There must be provided an operation indicator for each of the words in the question to indicate whether the word is part of an AND, OR, NOT, WORD, STRING, etc. In the present system a special number is utilized to indicate a particular logical operation which is to be performed in connection with a particular question word. In the embodiment of FIGURES 2A thorugh 2E this number also happens to be the address of a particular storage location in a machine storage area which is to be utilized to compile the results of successful matches on the word associated with said operation indicator number. The precise manner in which this number is utilized in conducting the search and controlling subsequent entry of results in memory will, of course, be explained specifically subsequently in the specification. It is also necessary to provide some indication of word separations to be carried with each question word in that section of memory wherein the question words are stored in their original format. This could be either a special symbol or a blank. Thus, each question word prior to alphabetization will have associated therewith a relative address, a word length indicator and a question word separator. The next operation is the alphabetization of the question words. As indicated previously with respect to alphabetization of the data base, relative addresses and all other associated information is carried along with each question word. Subsequent to the alphabetization, the relative addresses together with the respective special logic operation indicators are retained in the alphabetized list to be utilized to extract the question words in alphabetical order from memory and stored in an appropriate machine storage location and the normal text question words together with word length indicators and word separators are stored in the additional machine storage location. The manner in which the logic operation indicators are utilized together with the alphabetized list of relative addresses to access question words from memory will likewise be clearly explained subsequently with respect to the description of the specific embodiment of the invention disclosed in FIGURES 2A through 2E.

Subsequent to the above alphabetizing operations for both the data base and the question words, this information is appropriately stored in four different predetermined sections of the machine storage. In the disclosed embodiment the normal text form for both the data base and the questions is stored in the Variable Length Memory while the alphabetized list for both data base and questions is stored in the Fixed Length Memory.

The specific content of the memories as anticipated by the present embodiment is clearly shown by the examples and tables which follow subsequently in the description. In these examples the structure and content of the various sections of memory will be readily apparent.

As stated previously, these four separate segments or batches of information are stored in the machine at the four different storage locations indicated at predetermined addresses therein and are thus ready for accessing during the actual searching operations. The searching actually comprises withdrawing in a sequential fashion the question words from the memory and comparing same with the data base. As indicated before, the actual comparison or matching follows certain prescribed lines until it is determined that a particular question word is or is not contained in the data base and if not, the search will proceed to the next desired question word until such question word is located with the successful match. Each time a match is found, an indication of such match is stored at a fifth location in main memory, such location being directly ascertainable from the operation indicator stored with that particular question word. Thus, as the search proceeds through a list of question words and matches are found, a compilation is built up in memory at the special logic operation addresses of the results of said search. After the search is complete, the results of the search are determined by accessing the storage locations where such result indications have been placed and the results of the search compared with the results desired as stated in the question. The answers provided by this system may either be print outs of the text or data base material satisfying the question criteria or may alternatively be a mere print out of an identification of the particular portion of the data base in which a successful match was found.

It should be noted that the present embodiment as disclosed in FIGURES 2A through 2E provides means for concurrently processing a plurality of questions, however, each question is completed before the next is begun and the results indicated in a special series of result storage devices which may be interrogated at will. The exact manner in which the results are kept separate will be apparent from the subsequent description of the disclosed embodiment.

It will be apparent from the above very general description of the present Information Retrieval system that since machine memory must be used in processing the questions and the data base that there will be some finite limit placed on the size of the data base and/or the number of questions which may be concurrently processed. Since the data base is normally many, many orders of magnitude larger than the questions to be asked to same, it is anticipated by the present invention that the data base may be broken up in convenient segments capable of storage in the machine memory and the very same questions processed against these various segments of the data base. Thus, the data base may be broken up into convenient size segments susceptible of storage in the machine memory and each segment be completely preprocessed and may be run against any set of questions desired. Further, a given set of questions may be run against all of the segments in the data base or any desired portion thereof. Thus, the over-all flexibility of the system is readily apparent.

In summation, the Information Retrieval system of the present invention offers simplicity, flexibility and efficiency in operation in that it bypasses the usual coding, pre-indexing, classification, and thesauri problems often associated with currently used Information Retrieval systems. The three primary concepts which are interrelated and provide the above enumerated advantages are the provision of the distinct two section data base, i.e., the normal text form and the alphabetized list of relative addresses relating thereto. The second is the utilization of the word length alphabetizing scheme for very rapid matching and thirdly, the utilization of the word STRING matching techniques which latter feature is very closely related to the setting up of the two part data base. The above three techniques all contribute to the over-all efficiency of the system in terms of greatly reducing machine time for search and especially where it is desired to search for adjacent word groups or word STRINGS.

Before proceeding further with a description of the particular embodiment of the invention disclosed herein, a discussion of the more important varieties of question logic will be set forth. While there are obviously a great many logical possibilities for doing any Information Retrieval problem, only the more important logic operations will be set forth and described in the present invention since it is believed that a description of these will be sufficient to allow a person skilled in the art to expand into other more complicated logic configurations. The simplest and most direct type of match is, of course, the individual or single word match. By this is meant a mere match of a single word which it is desired to find in a data base. In many instances a compilation of a list of salient words specified in the question will result in a sucessful match against a data base if a sufficient number of such words is given and found in the data base.

A second logic operation is the OR logic. As the name implies, one would desire to phrase a question in terms of OR logic where any one of a number of different words would satisfy the question if found in the data base; for example, if one were interested in finding a four wheeled, self-powered conveyance, the OR logic possibility could set up the words, automobile, or car, or truck, or vehicle, etc. Thus, if any of these words were found in a particular data base, a satisfactory match of the desired OR logic would have been obtained.

Another common logic operator is the AND logic. This logic operator would be used where for a particular question it is desired to find a plurality of words, all of which are deemed necessary by the questioner in order to satisfy a question. For example, if one were studying citrus fruits in general, an AND STRING might be oranges, lemons, grapefruits, and limes. Thus, for this logic operation to be satisfied, all four of these words would have to be found in the data base. It should be noted that the AND differs from the word STRING in that for the AND, the words requested may occur at any location in the data base and need not be contiguous whereas in a word STRING they must both be contiguous and in a particular order.

Yet another logic possibility is the ABSOLUTE YES logic. In the situation where a questioner desires to see all references, i.e., data base or examples when a specific item or name is used regardless of the other search logic or matching criteria, the questioner would use the ABSOLUTE YES operator to find these cases. This instruction is essentially an override and will cause a correct answer indication regardless of whether or not the remainder of the question criteria is satisfactorily located in the data base. For example, where it is desired to search for all references or examples of aluminum submarines, the words aluminum and submarines might be single match words; however, if it is desired to find all references using the particular term "aluminaut" regardless of any other criteria, the ABSOLUTE YES operator would be used with the term "aluminaut." Thus, if the word "aluminaut" were found in any data base segment, a positive answer for this segment against this question will automatically be given whether the words aluminum and submarine are found or not.

The CONDITIONAL AND is a logical operation combining the ABSOLUTE YES within an AND group wherein a plurality of words are ANDed together. The occurrence of a particular word of the AND forces a match for the entire AND. Thus, if the words aluminum, submarine and aluminaut were part of the group and aluminaut the conditional member, the occurrence of this word would force the satisfaction of the entire AND group.

The last and perhaps most important logical operation which will be dealt with is the word STRING. This logical operation is probably the most powerful search requirement that can be made as it not only requires particular words but also a particular order. The previous example of "to be or not to be" is a typical one for such a word STRING. Obviously, if a data base consisting of a plurality of literary references were searched, very, very few would have the above expression therein; thus, it may be seen that such a logic operator will automatically exclude a great quantity of the data base. It will also be apparent that the questioner must have very specific knowledge of the information desired or perhaps valuable reference sources may be lost. In any event, the ability of the present system to handle such word STRING searches in a very efficient manner lends great power to the Information Retrieval capabilities of this system.

The final logic operator, although not an operator as such, is the match criteria which states the results desired of the search based on a particular set of question words for a particular question. In other words, if sixteen single word matches, two AND sets, one OR set and a word STRING were asked for, any match found in a particular data base exceeding the number seventeen might be acceptable to the questioner and the actual data would merit actual visual inspection. In the present embodiment, it should be understood that each AND set successfully found will give a match criteria of "1" just as for a single word. The same also applies to OR sets and word STRINGS. In the case of the ABSOLUTE YES and the CONDITIONAL AND, a successful compliance with a match for either of these will cause a successful indication to be given for that particular data base segment being searched regardless of the other match criteria for the question.

Having thus generally outlined the philosophy of the questioning and the general operation of the system, a more specific description of the actual hardware embodiment of the invention as illustrated in the figures will follow.

The following is a List of Abbreviations which are used at various places in the specification and drawings where it was not expedient to write out the full name of a particular functional element.

LIST OF ABBREVIATIONS

| | |
|---|---|
| CFR | Criteria Found Register. |
| FLM | Fixed Length Memory. |
| FLMDR | Fixed Length Memory Data Register. |
| MAR | Memory Address Register. |
| MARCR | Memory Address Register Compare Register. |
| NQR | Number of Questions Register. |
| QCC | Questions Count Counter. |
| QWAR | Question Word Address Register. |
| QWC | Question Word Counter. |
| QWCR | Question Word Compare Register. |
| TWAR | Text Word Address Register. |
| TWC | Text Word Counter. |
| VLM | Variable Length Memory. |
| VLMDR | Variable Length Memory Data Register. |

Before proceeding with the description of the logical schematic diagram of the system as a whole shown in FIGURE 2 (i.e., 2A through 2E) several of the more important subcomponents or functional units will be described. The operation and general description of the Decoder (FIGURE 3), the System Clock (FIGURE 4), and the Fixed Length Memory (FIGURE 5) will now be set forth to better enable an understanding of the over-all system as set forth in the composite of FIGURE 2.

DESCRIPTION OF DECODER (FIGURE 3)

The Decoder is shown in FIGURES 3A through 3C. It will be seen that the Decoder is made up entirely of two inputs, single output AND gates and the two OR gates 200 and 202 which, as will be explained, provide the proper logic decoded output regardless of whether a particular logic operation number or address is part of the first, second, third, or some subsequent question. In other words, the circuitry of FIGURE 3 will provide an output on, for example, the 05 line if the logic operation number or address is 1005, 1025, 1045, 1065 or 1085. The series of eight flip-flops shown in the upper portion of FIGURES 3A and 3B actually constitute the register flip-flops of the Question Word Address Register (QWAR). It should first be noted that the Decoder is set up for decoding binary coded decimal or BCD code. Thus, for each digital position there must be four binary fields which can be arranged to represent any of the decimal digits 0–9.

It will be noted that each of the flip-flops on FIGURES 3A and 3B has one or more AND circuits connected to each of its "1" and "0" sides. Depending upon the particular number stored in the flip-flops of the QWAR paths will be set up within the Decoder which will ultimately provide a pulse on one of the lines 00–19 shown at the right hand margin of FIGURE 3C. Supposing, for example, it were desired to decode the number 16, this number would be represented by two 4 bit groups of 0001 and 0110 which is the binary representation for the number 16. Assume now that the flip-flops of the QWAR have this binary expression stored therein as is indicated in the drawing. The current paths are indicated by the heavy lines on the drawing. Thus, starting with FIGURE 3A it will be noted that the AND gate 204 is energized by the presence of the voltage on this one line and the fact that the "0" position of the first flip-flop is actuated. The output of AND gate 204 provides one input to AND gate 206, the other input being provided by the "0" setting of the second flip-flop. The output of AND gate 206 in turn provides one input to AND gate 208, the other input of which is provided by the "0" setting of the third flip-flop. AND gate 210 is enabled by the "1" setting of the fourth flip-flop and the output of AND gate 208. The output of AND gate 210 provides an input to the OR gate 202 which in turn provides one input to the final AND gate 212, the other input to AND gate 212 is provided in the following manner.

Referring now specifically to FIGURE 3B, the first or leftmost flip-flop being set to a "0" enables AND gate 214, the output of which enables AND gate 216 together with the "1" setting of the second flip-flop. AND gate 218 is enabled by the output of AND gate 216 plus the "1" setting of the third flip-flop and AND gate 220 is enabled by the output of AND gate 218 and the "0" setting of the fourth flip-flop. The output of AND gate 220 provides the second input to AND gate 212, thus bringing up the line 16, which line is shown on FIGURE 2 as one of the outputs of the Decoder.

It may thus be seen that the Decoder illustrated in FIGURES 3A through 3C is capable of decoding any number from 0–99 in batches of 20. Or in other words, any five numbers exactly 20 apart will produce an output on the same output lines on FIGURE 3C, such as the numbers 4, 24, 44, 64, and 84. It will, of course, be remembered that the first two digits of all of these numbers, i.e., 10, are being ignored. Thus, it may be seen that the particular Decoder embodiment illustrated is capable of decoding logic operation numbers for up to five questions.

It will be apparent that any other Decoder configuration, as is well known in the art, could equally well be used to perform this decoding operation. More specifically, a Decoder utilizing the standard binary coding rather than binary coded decimal could be utilized with the same results such that the decoding gates for a given set of numbers could all be ORed together to provide the above outputs on arithmetic progressions of 20.

A significant feature of the present Decoder, as will be clearly apparent, is that regardless of whether the logic operation Results Register address is 1002, 1022, or 1042, the same logic operation will be performed by the system regardless of where the results of this operation are to be stored in said Results Register.

DESCRIPTION OF THE SYSTEM CLOCK (FIGURE 4)

Referring to FIGURES 4A and 4B there is shown a logical schematic diagram of the System Clock for the embodiment of the invention disclosed in FIGURES 2A through 2E. The individual clock stages comprise single shot multivibrators and are thus designated by the expression SS 1, etc. As will be apparent from the description of the device, each of the clock stages provides a first or turn on pulse as soon as the clock is actuated by a suitable input which may be from an external source as in the case of clock stage #1, from an OR circuit as is the case with clock stage 17, or from the turn off pulse of a previous clock stage. At a certain predetermined time after the occurrence of the turn on pulse, a turn off pulse is produced. This turn off pulse, when utilized other than to initiate a subsequent clock stage, is referred to when the composite drawing of FIGURES 2A through 2E has the title "fall of SS xx." Thus, gate 76, located adjacent the Logic Decoder block is actuated by the "fall of 4A" which indicates that is the turn off pulse from clock stage 4A which actuates the gate circuit 76. As will be noted in the drawing of FIGURES 4A and 4B, certain of the clock stages operate sequentially and others branch into other tests or operations which are non-continuous with respect to the numbering of the clock stages. These branch points are quite obvious from the drawing which indicates by means of a line to which clock stage a particular turn off pulse proceeds. Alternatively, an appropriate reference numeral together with an arrow pointing away from the particular clock state indicates that element of the diagram of FIGURE 2A to which a particular clock pulse is connected. Similarly, all of the inputs to the clock stages are clearly indicated as coming from a previous clock stage or from a specifically indicated element from the logical schematic of FIGURE 2. This is done by an appropriate reference numeral together with an arrow pointing toward the particular clock stage. It will be further noted, that certain of the clock stages, i.e., 2, 5, 12, 17, 80, etc., are initiated by a plurality of inputs. Since the clock sequence may be initiated by any of such plurality of inputs, said inputs are grouped through a conventional OR gate as indicated in the drawing which will produce a desired initiation pulse for the next succeeding clock stage.

As stated, the inputs and various outputs of the individual clock stages are designated by the reference numeral or abbreviation designation of the particular element of the logical schematic diagram of FIGURES 2A through 2E to which that particular clock pulse is transmitted. Further, an identification appears on the logical schematic diagram of the source of each input pulse from the clock to avoid any chance of error or ambiguity in said diagram.

DESCRIPTION OF THE FIXED LENGTH MEMORY (FIGURE 5)

The Fixed Length Memory as indicated and illustrated in both FIGURES 1 and 2 is a conventional three dimensional random access memory, any word location of which can be selected by concurrently selecting an X and a Y address. Conventional memories of this type may be found in any of a very large number of standard reference texts. However, the following general description of the memory is though to be helpful in explaining the various functions of such a conventional computer building block. The memory and its peripheral controls consist of the Fixed Length Memory block itself which conventionally would consist of a great number of magnetic cores but which could also be composed of magnetic thin film storage elements and the like. Additionally, there is a Memory Address Register which feeds into X and Y drivers which are actually driving amplifiers for producing the final selection pulses for providing the half select pulse to the desired X and Y planes. The other primary segment of the memory which appears in the other drawings is the Data Register which receives data from memory or into which data is placed before it is read into memory. Memories of this type require a memory cycle, the first portion of which is known as the "read" portion and the second portion of which is referred to as the "write" portion.

STANDARD MEMORY—CHART 1

```
Read Access
Read memory word into Data Register
Gate Data Register to output lines
Write Data Register back to memory
         Write Access
Read memory word into Data Register
Gate input data to Data Register
Write Data Register back to memory
```

Chart 1 lists the sequence of operations for a standard memory such as shown in FIGURE 5. The word in the main Fixed Length Memory is addressed by the actual binary address placed in the Memory Address Register. The Y portion of this address controls the Y drivers and the X portion of the address controls the X drivers as indicated in the figure. During the "read" portion of the memory cycle suitable control pulses are applied to the drive lines going from the X and Y drivers into the particular X and Y core planes selected to in turn select the proper word in the memory and direct it through the sense amplifiers into the Data Register. A suitable pulse is applied to the gate enabling line to enable the gate 18 to pass the data to said Data Register.

If the memory access is a read access, the data in the Data Register is gated through the "data out line" through the gate circuit therein to some other storage location in the computer. After this output operation the contents of the Data Register are read back in to the original location in the Fixed Length Memory by a conventional "write" operation. This is done by again operating the X and Y drivers, producing pulses at the address indicated in the Memory Address Register and concurrently, operating the inhibit drivers as is well known in the magnetic storage arts. In this manner, the contents of the Data Register are written back in the Fixed Length Memory at the same location from which it was read.

If the memory access is a write access, then the contents of the Data Register are changed by first performing a "read" portion of the cycle wherein the current contents of the memory are read into the Data Register; but instead of writing this data back into memory, new data is gated into the Data Register on the "data in line" through a suitable gate circuit and this new data is written into the memory in place of the data just read out.

As stated previously, the above description is merely intended to be very general of the operation of such standard random access magnetic memories. Many of the details will vary between such memories. For example, in some memories for a "write" cycle it would not be necessary to first read the information out at a given address location but the new inputing cycle would merely write the new information directly over the information already stored thereat. Referring specifically to the figure, the various input pulses to the X driver, the Y driver to the three gates and the inhibit drivers are suitable clock pulses which initiate the operation of these circuits at a precise cycle time and which have accordingly not been labeled.

A memory of this type in substantially unaltered form may be utilized as the Fixed Length Memory described in the present embodiment of the invention. For the purposes of the invention it would be necessary to provide a machine word approximately sixteen characters, eight of which would be utilized for the left hand or Variable Length Memory addresses and the right hand portion of eight characters which would be utilized for indicating the binary logic operation indicators or addresses within Fixed Length Memory.

The Variable Length Memory described in the present embodiment of the invention is in actuality a Fixed Length Memory but only one character appears at each addressable word location. Therefore, to gate out an eight character word from the Variable Length Memory it would be necessary to provide eight sequential addresses beginning with the first character address of the word and the information would, in essence, be read out in serial fashion from the memory beginning with either the left hand or right hand character thereof. However, for the present embodiment it is assumed that the read out progresses from the left hand portion of a particular word stored in the Variable Length Memory so that the word length indicator is the first digit read out of the memory. For purposes of explaining the present embodiment, it will be assumed that the Variable Length Memory is of a one character store variety and the words stored therein are read out sequentially one character at a time. The controls and tests necessary to determine when the end of a word has been reached will be clearly apparent from the description of the specific embodiment as set forth in FIGURE 2. Thus, the Variable Length Memory will include basically to same components as illustrated for the Fixed Length Memory of FIGURE 5. In other words, it will have the Main Memory portion, a Memory Address Register, a Data Register, a various X and Y drivers, inhibit drivers, and sense amplifiers, together with various gate circuits and interconnecting cables. Obviously, the Variable Length Memory many have many different designs as indicated for the Fixed Length Memory above. However, for the purposes of practicing the present invention, any Variable Length Memory whether it be called Variable Length or Fixed Length capable of accessing information stored therein a character at a time in a serial fashion will work satisfactorily with the general system embodiment disclosed in FIGURE 2.

GENERAL DESCRIPTION OF THE SYSTEM

In the subsequent description of the invention, the expression "text words" will be used to refer to the data base and "question words," as is apparent, will refer to the questions. It will first be assumed that the question words and the text words are stored in the Variable Length Memory. The Fixed Length memory is used to store the alphabetically arranged addresses of both the question words and the text words. These addresses of the question words and the text words are the starting addresses of these words in the separate Variable Length Memory. In the present disclosed embodiment of the invention, by way of example, only the word locations or addresses 0 to 99 in the Fixed Length Memory are used for question words and the word locations 100 to 999 are used for text words. Additionally, the word locations 1000 to 1099 are used as the special logic operation indicator numbers and consequently, the Result Table addresses, as will be described more fully subsequently. Two counters are used to access successive addresses stored in the Fixed Length Memory, one for question words which is reset to 0 and one for text words which is reset to 100. These counters are used to provide addresses to the Memory Address Register of the Fixed Length Memory to gate successive question words and text words from said memory.

In the disclosed embodiment of the invention the format for both the "question words" and the "text words" is such that the lower left hand or first two characters are reserved for a two digit number which indicates the length of the word. In the embodiment shown and in the examples illustrated in the subsequent tables, these word length indicators are actually a count of the number of characters in a particular word.

If the memory access of the Fixed Length Memory is first made to bring out the address of the first question word, this address is then utilized to obtain this question word from the Variable Length Memory. Since the Variable Length Memory being described in the present embodiment is essentially a single character storage memory, the words will be read out a character at a time. Therefore, the first character read out will be the first digit of the world length indicator which is stored in one of two Comparison Registers. The next operation is to access the first text word using the address stored in the Fixed Length Memory beginning with the address 100. This address is then utilized to obtain the first word from the Variable Length Memory and the first digit or character thereof which is the first digit of the word length indicator is placed in the other Comparison Register for subsequent comparison to see if the numbers match. A compare operation then follows between the leftmost characters of the question word and the leftmost characters of the text word. If the comparison agrees, the comparison operation continues with subsequent characters of the question word and the text word. The first two compare operations for each text word and question word determine whether the word length in the same. As stated previously, if the lengths are different, then, of course, there is no need to further compare the words. If the lengths do agree, then it is necessary to bring out the subsequent alphabetic characters of both the question and text words for comparison. The comparison operation will continue as long as the individual characters of the text and question words compare. As soon as a disagreement occurs, the comparison of the word is terminated and either a new question or a new text word is brought out depending upon the nature of the non-comparison as was mentioned briefly previously. If the complete question word agrees with the particular text word, it is then necessary to bring out the logic associated with the question word. In order to determine the end of the comparison at the alphabet portion of the word a special symbol ($) is inserted as the rightmost character of the question word. This symbol is a symbol which would never appear in the text language and as soon as this symbol appears, it immediately causes a branch to the logic routine. In other words, every time a character is brought out from the question word it must be checked to see if it is a special character. This check need not be made on the first three characters of the question word as this special character could never exist in these three positions as will be apparent.

In the present embodiment of the invention, the special character ($) is utilized to mark the end of a question word. However, it is apparent that some other system, such as the counting of characters based on the first character count stored at the beginning of each question word, could similarly be done to assure that the system knew when it had reached the end of a particular question word.

As stated previously, when a disagreement occurs on either the length of the words or on one of the alphabetical characters of the words, the way in which this disagreement occurs will determine whether a new question word should be accessed or a new text word. For example, if the length of the question word is less than the length of the text word, a new question word must be accessed and this will continue with the same text word until an agreement occurs or if no agreement occurs, until the length of the text word is less than the length of the question word. If the length of the two words agree, then the first alphabetic character which does not agree will determine whether a new question or a new text word must be accessed. For example, if this text word starts with an "A" and the question word starts with a "B," then obviously the question word should be retained and a new text word brought in. In order for these controls to work it is obvious that both the question and text words must be alphabetized according to word length, as outlined previously.

Having generally outlined the manner in which the actual word matching or comparison is acomplished, which is obviously the most important individual operation of such an Information Retrieval system, the next operation to be considered is logic which operates generally as follows. After the match on the word, it must be determined if the logic is satisfied. If both the word and the logic are satisfied, the program must proceed to the next question word. If the words agree, but for some reason the logic does not agree, then the program must step to the next word. The reason for this is that the same word can exist several times in the list of question words and also exist several times in the list of text words. It will be noted that in the event of a word duplication or repetition, the word having a STRING indicator must always be placed last in the list. The first time that the question word matches the text word, the logic must be examined. If the first question word is either an AND or OR, it will be satisfied by the text word and the program will step to the next question word. For example, if there were three question words and three text words all alike and the first question word had AND logic with it, it would be satisfied by the first text word and the program would step to the next question word. The next question word would have OR logic associated with it which would also be satisfied by the first text word.

The third question word might have STRING logic associated therewith which, it will be assumed, would not be satisfied by the first text word. The program then steps to the next text word which again, it is assumed, does not satisfy the STRING logic. The program would again step to the third text word which, it is assumed, does have a proper STRING logic, i.e., the third text word turns out to have been the first word of a STRING of words in the text which has the same sequence of words as the STRING which is being searched for. If the situation were in reverse, that is, the first question word had STRING logic, the second word had AND logic and the third question word had OR logic but the text words were arranged such that only the last text word was capable of satisfying the STRING logic, then the operation would be as follows. The STRING logic would not be satisfied by the first text word, so the controls would step to the second text word which again would not satisfy the logic and cause a step to the third text word where the logic would be satisfied. Following this, the controls step to the next question word keeping the last text word in the machine. The AND logic would also be satisfied by this last text word which would cause the program to step to the third question word which has the OR logic associated with it while still maintaining the last text word in the machine. This OR logic would also be satisfied by the last text word.

As stated briefly before, special logic indicators are utilized with the question words and actually stored with the relative address of successive question words in the Fixed Length Memory, which indicators may be accessed upon command from the system to determine just what sort of logic is to be satisfied by a particular match. The logic indicators used with the present system serve two functions. The first is an actual indication of the particular logic which must be satisfied such as an ABSOLUTE YES, a NOT, CONDITIONAL AND, AND, ORs, single word matches, etc. Additionally, the particular number used to indicate the logic serves as an address into the Fixed Length Memory into which the results of a particular logic operation must be placed upon satisfactory occurrence of a match in a data base. An exemplary list of logic operators and the logic which they satisfy is illustrated in the following Question Logic Table.

Register. It will further be noted in this table that the numbers 1000 to 1019 refer to question #1, the numbers 1020 to 1039 refer to question #2, the numbers 1040 to 1059 refer to question #3, etc. It is, of course, to be understood that a plurality of questions in excess of three could be utilized in special logic numbers and storage locations provided therefore. Further, more than twenty operations could be provided for since more single matches, OR's, AND's, etc., might be desired. However, provided with the teachings of the present invention and the embodiment illustrated to accomplish same, it is believed that any person skilled in the art could extend the present invention in order to merely provide for more logic.

As will be clearly apparent from the specific example which will be presented subsequently in the specification, whenever a word is utilized in a question, it initially must be given one of the logic numbers depending upon what logic is involved, i.e., an OR and also whether it would be question #1, #2, #3, or some further question. Provided with this number, there must also be a number which is to be stored in memory at the particular address, for example, if an AND were anticipated having four members, each member of the AND would be provided with the same number, i.e., 1003, and the number 4 would be stored at the address 1003 in the Fixed Length Memory. Thus, as each member of the AND were found, the number in the memory at location 1003 would be decremented by 1. Thus, assuming that all four members were found, the final number stored at location 1003 would be 0. Similarly, for OR logic, the number 1 would be stored at, for example, 1006 and if five words were involved, the number 1006 would be stored with each word and since only one word is required to satisfy the OR, the number 1 would be stored at location 1006 in the Fixed Length Memory. Thus, whenever a question word is encountered having the logic indicator 1006, the information at 1006 is first looked at before it is attempted to match this word since if a 1 is present therein, the match will continue; however, if a 0 is stored therein, it is apparent that it is

QUESTION LOGIC TABLE

| Logic Operation | Set to ON LOAD | Memory Address and Logic Indicator | | |
|---|---|---|---|---|
| | | Question #1 | Question #2 | Question #3 |
| ABSOLUTE YES | 1 | 1000 | 1020 | 1040 |
| NOT | 1 | 1001 | 1021 | 1041 |
| CONDITIONAL AND | Actual No. | 1002 | 1022 | 1042 |
| AND | Actual No. | 1003 | 1023 | 1043 |
| CONDITIONAL AND | Actual No. | 1004 | 1024 | 1044 |
| AND | Actual No. | 1005 | 1025 | 1045 |
| OR | 1 | 1006 | 1026 | 1046 |
| OR | 1 | 1007 | 1027 | 1047 |
| SINGLE WORD | 1 | 1008 | 1028 | 1048 |
| SINGLE WORD | 1 | 1009 | 1029 | 1049 |
| SINGLE WORD | 1 | 1010 | 1030 | 1050 |
| SINGLE WORD | 1 | 1011 | 1031 | 1051 |
| SINGLE WORD | 1 | 1012 | 1032 | 1052 |
| SINGLE WORD | 1 | 1013 | 1033 | 1053 |
| SINGLE WORD | 1 | 1014 | 1034 | 1054 |
| SINGLE WORD | 1 | 1015 | 1035 | 1055 |
| SINGLE WORD | 1 | 1016 | 1036 | 1056 |
| SINGLE WORD | 1 | 1017 | 1037 | 1057 |
| STRING FOUND | 0 | 1018 | 1038 | 1058 |
| STRING REQ'D | Actual No. | 1018 | 1038 | 1058 |
| CRITERIA REQ'D | Actual No. | 1019 | 1039 | 1059 |

In the above table it will be seen that the left hand column is an identification of the logic operation called for by the logic indicators in the three right hand columns. Thus, the numbers 1000 to 1019 indicate both a logic operation and also an address in the main memory where the results of the particular logic operation are to be tabulated for subsequent retrieval during termination operations wherein the system desires to see whether all the criteria for the question have been satisfied. This area of memory will subsequently be referred to as the Results no longer necessary to continue with this match as the OR has already been satisfied and the system will index to the next word.

Single matches cause a 1 to be stored at the particular memory address location in the Fixed Length Memory and as each word desired is found, this number will be decremented back to a 0. For doing a STRING logic operation, the total number of words in the STRING, i.e., seven, would be stored at machine location 1018 and as each new word of the STRING was found, the number in the Fixed Length Memory would be decremented upon the finding of each word.

Finally, at address 1019 and 1039, etc., the criteria required for the particular questions is inserted. This is a number which is used in the finalizing operations wherein the questioner states how many successful matches are required with the particular question to constitute a successful answer to such question. Briefly, the way in which this is done is that all of the Question Logic Tables or the words in memory are set to the number 1 or greater for any search operation. As particular words are satisfied, as indicated above, the number in the Fixed Length Memory Results Register is decremented to a 0. Therefore, after the actual search has been completed by scanning the logic storage operation areas each place the 0 is encountered, it may be assumed that a successful match has occurred. Thus, the number of zeros can be counted and compared against the criteria required to determine whether the question has been successfully answered.

From the above description it may be seen that the addresses 1000 through 1099 are utilized both to indicate the logic operation desired for a particular word and also to designate the particular storage area in which the results of the match are to be tabulated for subsequent finalizing or summing up operations. Thus, this area of memory or Results Register might be termed a "scratch pad memory" wherein results are tabulated as the Information Retrieval process progresses.

As stated previously, one or more questions may be run simultaneously with the present system wherein the only requirements are that they be alphabetized and have the proper logic operation indicator utilized therewith and the system automatically will transmit the answers to the proper places in the Results Register. Also, each question must be separated from subsequent questions by the special end of question indicator 1019, etc. Referring again briefly to the Question Logic Table, the way in which three different addresses may refer to the same logical operation is by use of the special Decoder which is shown in FIGURES 3A through 3C. By use of this Decoder, the numbers, 1007, 1027, 1047, etc., for an OR operation will all result in the same searching operation within this system. The only difference would be that the result would be stored in the particular address of the Results Register specified with the question word.

Assuming that three questions have been entered into the system and all question words have been answered, the system must know when to start the termination or summing up operations for each question. As stated previously, this is accomplished by use of a special "end of question" indicator. This indicator announces to the system that the last question word of a particular question has been tested for matching against the data base and this will start the termination or summation operation for this question wherein the contents of the Results Register are checked against the criteria for each question.

Controls are provided for individually checking the contents of the Results Register section of memory for each question and comparing the contents thereof with the criteria to determine whether successful matches against particular questions have occurred. Whether or not a particular question has been satisfied insofar as a comparison of its results against the criteria demanded thereof appears by a "1" setting of the particular criteria flip-flop shown in FIGURE 2E for that particular question. The exact manner in which these flip-flops are set will, of course, be described more specifically subsequently.

Having thus generally described the system and its theory of operation, reference will now be made to the particular embodiment of the system as illustrated in FIGURES 1 through 6. Referring first to FIGURE 1, there is shown a logical block diagram wherein each major section of the system is represented by a functional block.

Before proceeding with the description of FIGURE 1 and the specific embodiment of the system, it should be clearly understood that the data base is pre-processed and assembled and preferably put on tape before question words are prepared to be asked against same. This is apparent since a data base comprises the vast field of information of which it is desired to ask questions and a particular question will, of course, be only one slight instance of the type of information which it is desired to obtain from the data base. It is for this result that the data base would be preferably put on tape for subsequent transferral in finite batches to the Information Retrieval system. The questions are similarly pre-processed and alphabetized, provided with suitable logic operation indicated and either transferred into the machine directly from cards or from data tape depending upon which is more convenient for the particular use. Machine card systems for alphabetizing alpha-numeric data and grouping according to word length and then printing out subsequent cards, deleting certain fields thereof, are notoriously old in the electronic data processing field examples of card machines capable of performing all sorts of sorting operations would be the I.B.M. Model 083 or 101 Card Sorters.

It will thus be seen that all of the data base information and the question word information will, of necessity, be stored in both the Fixed Length Memory and the Variable Length Memory, as well as in the Number of Questions Register prior to the initiation of a cycle of operations for the system. Additionally, suitable numbers must be stored or pre-loaded into the Results Register for the specific question words, as was generally explained previously. These numbers, as will be apparent, constitute a part of the question criteria and must obviously be provided for the system.

In the following general description of the system with reference to FIGURE 1, the names of the blocks will be used rather than reference numbers, as all blocks are clearly labeled. It will be apparent that the two major segments of the system are the Fixed Length Memory and the Variable Length Memory. As described previously, these two memories are utilized to store both the data base and the question information. All operations of the system are under control of the System Clock and accordingly, most blocks are indicated as being controlled by the clock since the clock is actually utilized to determine various operation sequences which in turn are determined by tests made by various ones of the blocks.

The block labeled Word Counters contains the necessary counters to access successive text words and question words and at the beginning of a search or retrieval cycle are reset to an initial stage or address which corresponds with the first word location in the text words and question words. This counter is suitably incremented by the System Clock and is utilized to gate out successive question and text words when the system operations require same.

The two blocks labeled Question Word Address Register and Text Word Address Register are utilized to store the addresses obtained from the Fixed Length Memory from the alphabetized lists of addresses therein. These addresses are used to subsequently address the Variable Length Memory to gate out the actual text question words. Additionally, the Question Word Address Register is used as a holding register for the Logic Decoder which decodes the special logic operation indicators stored with a particular question word and initiates certain system operations in accordance therewith.

The Word Compare Circuitry block comprises those registers feeding out of the Variable Length Memory and the compare circuitry which actually compare the individual characters of each text word and question word. This block further comprises logic for determining whether the question word is smaller than, equal to, or larger than the character of the text word against which it is being compared. The expression, smaller than or greater than, refers to the comparison both when the word length indicators are being compared, in which case this comparison is obvious, and when the alphabetical characters are being compared. In the case of an alphabetical comparison, if the question word character is "greater than" the text word, it means that the question word character is further along in the alphabet than the text word character, i.e., "m" is further along than "c." Conversely, if the text word character is an "m" and the question word character being currently compared is a "c," an indication will be provided that the question word character is "less than" the text word character.

The word compare logic receives the output from the said word compare circuitry and sets certain controls and decides whether a new text word is to be obtained, whether a new question word is to be obtained, or whether the comparison is to continue over into the next character location as a result of said comparison in the word compare circuitry.

The block labeled Logic Satisfaction Compare Circuitry includes controls utilized both during the search operation and during the summation or termination proceedings wherein it is determined whether or not the criteria for a particular question has been satisfied by the search. Basically what this circuitry does is to determine whether or not a 0 is stored at a particular logic indicator storage location and the Fixed Length Memory. As will be explained more fully subsequently, this circuitry will determine whether it is necessary to compare a certain word or not. For example, where an OR has already been satisfied by a first occurrence, it is not necessary to continue for subsequent numbers of the same OR. Also, during the summation or termination operations the same circuitry is utilized to determine whether the logic criteria has been satisfied by determining which of the logic tables are 0, thus determines the criteria satisfaction.

The final block indicated is the Criteria Comparison Circuitry. This block contains the controls necessary for accessing the logic operation tables or Results Register where the results of particular comparisons are stored. Thus, it controls operations for accessing the storage locations and makes comparisons to determine whether or not the criteria for a particular question has been met and places the answers in a series of bistable elements which indicate whether particular questions have been satisfactorily answered. The block also contains control circuitry for maintaining the results of the various questions in separate locations. As stated just previously, this block operates in close conjunction with the Logic Satisfaction Compare Circuitry in making such final determinations. It is the Criteria Comparison Circuitry block which will contain the ultimate answers as to whether or not the various questions have been satisfactorily answered and by interrogating same, the answers to the questions relative to a particular base are obtained.

Having described the general block diagram of FIGURE 1 and the individual segment shown in FIGURES 3, 4 and 5, FIGURES 2 through 2E which comprise the logical schematic diagram for the disclosed embodiment of an Information Retrieval system constructed in accordance with the over-all teachings of the present invention will be described. FIGURE 2 is a composite showing the relationship of FIGURES 2A through 2E. A number of general comments will first be made about the drawing before specifically explaining the function of various portions thereof. It will be noted that a number of the larger boxes, such as the Fixed Length Memory, Variable Length Memory, Text Word Address Register, Logic Decoder, etc., are specifically labeled rather than given reference numerals. This is done in order to render their function in the over-all logical schematic more clearly understandable. It will further be noted that many of the gate circuits, OR gates, reset inputs, write access, read access and such operations are specifically indicated as being performed by series of numerals with the characteristic Cl appearing therebefore. This indicates that these operations are performed by clock pulses wherein the Cl indicates that the subsequent numbers are the turn on pulses of the specific enumerated clock stages following same. Thus, the three inputs to OR gate 92, just to the right to the Fixed Length Memory, receives inputs from clock stages 33, 52 or 57. This is indicated by the legend Cl 33, 52, 57. Similarly, a number of pulses are indicated as being initiated by a "fall of xx" wherein the "xx" represents a particular stage number, for example, gate circuit 127 appearing in the lower left hand corner of FIGURE 2D is indicated as being initiated by the "fall of Cl 14," which means the turn off pulse from clock stage 14.

As will be further readily apparent whenever a particular clock stage is being used to interrogate one of two or more possible conditions, the logical circuitry utilized to sense such a condition and to branch the control where appropriate is accomplished as follows. The turn on pulse of a particular clock stage is utilized to gate the information to a flip-flop which, depending upon the binary state of the information being interrogated, will set the flip-flop to a "1" or a "0." Then on the fall of said clock stage, or the turn off pulse, the condition of said flip-flop is momentarily gated to one of two sets of additional clock stages depending upon whether said flip-flop was previously set on the "1" or "0." This type of logic is utilized throughout the present system as illustrated in FIGURES 2A through 2E. Reference is specifically made to the bottom of FIGURE 2C wherein the series of criteria flip-flops all check for a "0" or not "0" signal output from the compare circuit 10 and each set of two gates and associated flip-flop is utilized as a branch control at such point in the control circuitry where a test for said "0" or not "0" condition out of the compare circuit 10 is desired. Essentially the same sort of a logic is utilized to test the outputs of compare circuits 12, 14, 16, and 18 as well as the output of the Logic Decoder.

Referring now specifically to the sections of the logical schematic diagram, the first major section of the system is the Fixed Length Memory which, as stated previously, is utilized to store (1) the list of alphabetized addresses together with the special logic indicator numbers therewith, (2) the list of alphabetized addresses of the text words and (3) constitutes the Results Register. As indicated, this memory also has its own Memory Address Register which, as is well known in the art, is utilized to address a particular word location in the memory and also has a Data Register which is the register utilized to hold data read out of the memory or to accept data to be re-stored therein. The various memory controls are not specifically shown since they have been described with reference to FIGURE 5. It will also be noted that the plurality of inputs from various clock stages are indicated as being provided to the read access line through OR circuit 58 and the write access line through OR circuit 60. It will be further noted that various incrementing and decrementing inputs are provided to the Memory Address Register and also to the Data Register. This is a well known operation with such register and a suitable pulse applied on an "increment" or "decrement" line causes the number currently stored in said register to be suitably incremented or decremented depending upon the line energized. The block marked ZERO just to the right of the Data Register is utilized to store the number 0 in the Data Register when the gate circuit 93 is suitably energized upon the receipt of a suitable pulse from OR circuit 92. This latter circuitry is provided to store a 0 in the logic Results Register as will be apparent in the following specific examples.

Next, it will be noted that the Question Word Counter and Text Word Counter are located in the upper portion of FIGURE 2A. As described briefly previously, these counters serve the function of keeping track of the particular question word or text word which the system is currently processing and provides for accessing of subsequent question words and text words upon suitable command. It will be noted that the Question Word Counter has an incrementing input which causes the current number in said counter to be incremented by 1 upon command by the system and also has an input to reset said counter to 0. This latter input is to start the system at its initial or first position since, it will be remembered, question words are stored in the Fixed Length Memory at the storage locations or addresses 0 to 99.

The Text Word Counter also has an incrementing input and a reset input. The increment input is for the same purposes as is the Question Word Counter above and the reset line is to reset this counter to the number 100 which is the address of the first word in a particular data batch stored in memory since, it will be remembered, the text words are stored in the presently disclosed embodiment in positions 100 to 999. Thus, when it is desired to initialize a search, the Text Word Counter must be reset to the number 100 in order to extract the first text word address. Addresses are gated out of both of these counters by means of the gate circuits 52 and 54 upon suitable command from the System Clock as will be understood.

The Question Word Address Register and its associated circuitry appearing in the lower portion of FIGURE 2A is for the purpose of receiving the information stored at a question word address as specified by the Question Word Counter. As explained previously, this information includes both the address of the specific question word in the Variable Length Memory in the left hand portion of said Fixed Length Memory word and contains a logic operation indicator in the right hand portion. It will thus be noted that the right hand and the left hand portions of the Question Word Address Register are separately accessible through suitable gate circuits. The left hand portion containing the actual address of a particular question word in the Variable Length Memory is transferred from a Question Word Address Register to the Memory Address Register of said Variable Length Memory through the gate circuit 70 on command of the System Clock. This address, as will be understood, is used to gate actual question words from the Variable Length Memory for the word comparison operations. It will be remembered that since the Variable Length Memory is adapted for character by character read out, means must be provided for incrementing this address by a single step. An increment input is provided to the Question Word Address Register on the left hand side through OR circuit 64 for this purpose. Thus, as single characters compare, the next character of a particular question word may be accessed by incrementing the address in the Question Word Address Register by 1.

Means are associated with the right hand portion of the Question Word Address Register for gating the logic operation number to the Memory Address Register of the Fixed Length Memory when it is desired to look at the number stored in the Results Register. Additionally, the Logic Decoder is connected directly to the right hand portion of the Question Word Address Register for the purpose of decoding the logical operator, as was explained with reference to FIGURES 3A through 3C. If the logic indicator #19 is encountered therein or the numbers #39, #59, #79 or #99, a signal will be provided to the gate circuit 74 which will set the associated flip-flop to a "1" or a "0" and thus, control the branching of the system to clock stage 111 or 4B as will be explained subsequently. If the numbers #02 or #04 are picked up in the Decoder, OR circuit 20 will be enabled and ultimately will set the flip-flop 02 to its "1" state. If the numbers #03 or #05 are detected, OR circuit 22 will be energized and flip-flop 03 will be set to its "1" state. If the numbers #00, #01 or #06 through #16 are detected, OR circuits 24 will be energized, thus setting flip-flop 00 to its "1" state. As will be described later with reference to the Clock Chart and specific examples, the setting of any of the flip-flops 00, 02, 03 or 17, which have been designated the logic flip-flops, to their "1" state will cause branching of the controls to particular control operations in accordance with the logic detected.

Figure 2B:
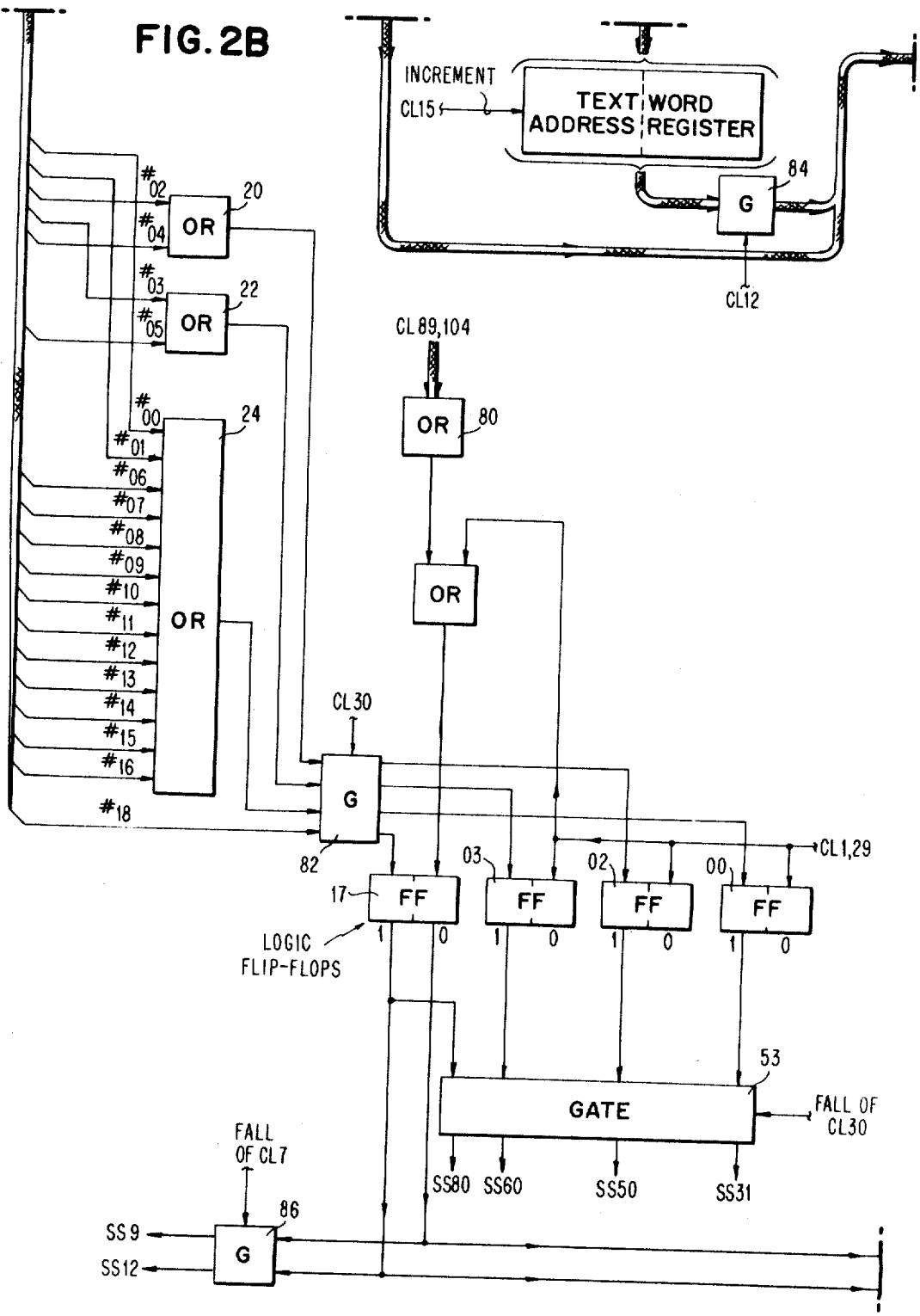

It will also be noted that this output #17 from the Decoder is not used as a begin symbol per se and thus does not appear in the Decoder output line in FIGURE 2B.

The Text Word Address Register operates similarly to the Question Word Address Register in that it receives specific text word addresses from the Fixed Length Memory at an address designated by the Text Word Counter and utilizes this address to address a particular text word in the Variable Length Memory. Also like the Question Word Address Register, an incrementing input is provided on this register for indexing the address stored therein by 1 to access successive character positions of the particular text word being analyzed as successive characters compare.

It should be noted at this time that as a comparison is made and the original starting addresses of a particular question or text word are modified by the incrementing controls, it is still possible to obtain this same word again by means of re-cycling the Question Word Counter and Text Word Counter to again bring out the original address of the word. This, however, will be clearly apparent by referring to the Clock Tables, the flow diagram of FIGURE 6 and the subsequent examples.

The Variable Length Memory as disclosed in the present embodiment is essentially the same in structure as the Fixed Length Memory except that it stores information therein character by character with the result that better packing density is obtained within the memory since there are virtually no vacant character storage locations between adjacent words. Additionally, for purposes of the present disclosed embodiment, this type of memory is conveniently suited for the character by character comparison of the question and text words to obtain a mismatch at the earliest possible time during a comparison cycle. The Variable Length Memory also has a Memory Address Register and a Data Register as is standard with such memories and since it is not necessary with the disclosed embodiment of the present searching system to do any writing, it is only necessary to show a "read" access control operating through the OR circuit 120. However, it will be understood that the Variable Length Memory is initially filled with data from an external tape or card system, as was described previously, in the same manner that the Fixed Length Memory was initially filled.

During an actual word comparison operation, the characters of the question words are first transferred into the Question Word Compare Register and the characters of the text word are gated into the Data Register and a comparison is first made to see if the character currently in the Question Word Compare Register is an "end of word" symbol ($), in which case a special output would be provided through gate 126 and would cause a branching in the system logic. This comparison is actually accomplished by means of the compare circuit 14 and the block marked LOGIC SYMBOL which contains the special "end of character" symbol ($). If the particular character in the Question Word Compare Register is not an "end of word" symbol, a comparison is made with the character stored in the Data Register by means of the compare circuit 12 and a suitable output is provided which is passed through gate circuit 124. Depending upon whether the number or letter in the Question Word Compare Register is greater, equal to, or less than, the character in the Data Register, certain of the word compare flip-flops will be set to a "1" or a "0" as will be apparent from the outputs marked in FIGURE 2D. Depending on the output of the compare circuit 12, the system will branch in a particular manner to either gate the next two characters of the question word and text word if the previous comparison was satisfactory or to gate the next text word or the next question depending upon whether the comparison was greater or less than, as will be clearly apparent from the subsequent description. Gate circuit 129 controls the initiation of subsequent system operations.

The compare circuit 10 and the ZERO block appearing in the lower part of FIGURE 2C together with the associated gate circuits and flip-flops designated as the criteria satisfied flip-flops are for the purpose of actually examining the contents of the logic Results Register portion of the memory and for a particular logic operation determine whether that required logic has been satisfied. For example, if all the members of an AND have been found or if an OR has been satisfied, this circuitry controls operations during the actual search operation, e.g., if an OR has already been satisfied, it is not necessary to look for subsequent members thereof. The circuitry further examines various result locations during the termination routine when it is being determined whether the question was successfully answered. As stated previously, if a 0 is stored in a particular location of the logic Results Register, it means that a successful match occurred at this location and a 1 is added to the Criteria Found Register.

The Criteria Found Register is utilized to tabulate or totalize the number of satisfactory matches found for a particular question when sequentially examining the logic Results Register for a particular question word, i.e., from #00 through #19 for the first question and the number ultimately stored in this register is compared via compare circuit 16 with the "criteria requested" number stored at location #19 for said question. In the event of a successful comparison, i.e., the Criteria Found Register being equal to or greater than the criteria requested, the suitable criteria flip-flop is set to a "1," in FIGURE 2E, which indicates a satisfactory solution for the particular question to which each flip-flop is related.

The circuitry shown in FIGURE 2E is for the purpose of controlling the termination operation wherein the logic Results Register for each question is interrogated. At the beginning of the termination or summation operation, the Question Counter is reset to 1 since this will be the first question of the series which will be examined and the Decoder network directly therebelow brings an output on one of its output lines which indicates which question is being currently examined. The result of the output from the DECODER block energizes one of the gates 30, 32 or 34. The energization of these gates causes the two addresses located in the blocks directly above each gate to be transmitted to the MAR Comparison Register and to the Fixed Length Memory Address Register. In the case of question #1, the address 1000 is transmitted to the Memory Address Register and the address 1018 transmitted to the MAR Comparison Register. Subsequent controls cause the contents of the logic Results Register in the Fixed Length Memory to be read out and compared from the address 1000 through 1018 and subsequent to this complete read out of the logic Results Register, a determination is made via the compare circuit 16 as to whether the criteria for that particular question has been successfully met. The compare circuit 18 determines when the logic Results Register for the complete question has been completely examined and indicates that the "criteria found" versus "criteria requested" comparison is to be made by means of an output from the gate circuit 113. Whether a successful or unsuccessful indication is to be stored in the criteria flip-flops is determined by the actuation of the gate circuits 114 or 116 which causes a "1" or a "0" to be stored in this suitable criteria flip-flop.

The logic and controls for only three questions are shown in the diagram in FIGURE 2E; however, it is to be understood that many more questions can be provided for by suitably duplicating the circuitry shown. For example, an additional gate circuit having the addresses 1060, 1078, 1080 and 1098 could be obviously provided to give a capability of five questions.

The compare circuit 19 is utilized to compare the contents of the Question Count Counter with the number stored in the Number of Questions Register at the beginning of the search routine to determine when all of the questions have been interrogated and the particular search operation is ready to be terminated.

It is believed that the above description of the logical schematic diagram of FIGURES 2A through 2E clearly explains the operation of all of the significant components of the present system. The specific operations of each functional component have thus been described and the result of the particular function clearly explained. To further illustrate the operation of the system, the following TIMING SEQUENCE CHART is included which clearly specifies the particular operation performed by each of the clock steps.

TIMING SEQUENCE CHART

Cl 1 -------- Reset Question Count Counter to 1
Reset Question Word Counter to 0
Reset Text Word Counter to 100
Reset flip-flops 17, 03, 02, 00 to "0"
———→SS 2

Cl 2 -------- Gate Question Word Counter to Memory Address Register of Fixed Length Memory
———→SS 3

Cl 3 ------- Read Fixed Length Memory—(address into Data Register)
———→SS 4

Cl 4 ------- Gate Fixed Length Memory Data Register to Question Word Address Register
———→SS 4A Cl 4A ------ Test Question Word Address Register Decoder
if on 1019 (used to indicate end of questions)
———→111
if not on 1019———→SS 4B Cl 4B ------ Gate Question Address Register (right hand to Memory Address Register of Fixed Length Memory
———→SS 4C Cl 4C ------ Read Fixed Length Memory
———→SS 4D Cl 4D ------ Test Fixed Length Memory Data Register (test to see if satisfied)
if zero———→SS 17
if not zero———→SS 5

Cl 5 ------- Gate Question Word Address Register (left hand) to Memory Address Register of Variable Length Memory
———→SS 6

Cl 6 -------- Read Variable Length Memory
———→SS 7

Cl 7 -------- Gate Variable Length Memory Data Register to Question Word Compare Register
if F.F. 17 is on "0"———→SS 9
if F.F. 17 is on "1"———→SS 12

Cl 9 -------- Gate Text Word Counter to Memory Address Register of Fixed Length Memory
———→SS 10

Cl 10 ------- Read Fixed Length Memory
———→SS 11

Cl 11 ------- Gate Fixed Length Memory Data Register to Text Word Address Register
———→SS 12

Cl 12 ------ Gate Text Word Address Register to Memory Address Register of Variable Length Memory
———→SS 13

Cl 13 ------ Read Variable Length Memory
———→SS 14

Cl 14 ------ Compare Question Word Compare Register with Variable Length Memory Data Register and with word separator
(A) if agree with word separator and F.F. 17 is on "0"
———→SS 29

(B) if disagree with word separator and agree with Variable Length Memory Data Register
——→SS 15

(C) if disagree with word separator and greater than Variable Length Memory Data Register
——→S 16

(D) if disagree with word separator and less than Variable Length Memory Data Register
——→SS 17

(E) if agree with word separator and F.F. 17 is on "1"——→SS 80

(F) if disagree with word separator and F.F. 17 is on "1"——→SS 100

Cl 15 ------- Increment Question Word Address Register (left hand) and increment Text Word Address Register
——→SS 5

Cl 16 ------- Increment Text Word Counter
——→SS 2

Cl 17 ------- Increment Question Word Counter
——→SS 2

Cl 29 ------- Reset flip-flops 00, 02, 03 and 17 to "0"
——→SS 30

Cl 30 ------- Test Question Word Address Register Decoder
if on 00, 01, 06 through 16 set F.F. 00 to "1"
——→SS 31
if on 02 or 04 set F.F. 02 to "1"
——→SS 50
if on 03 or 05 set F.F. 03 to "1"
——→SS 60
if on 17 set F.F. 17 to "1"
——→SS 80

Cl 31 ------- Gate Question Word Address Register (right hand) to Memory Address Register of Fixed Length Memory
——→SS 32

Cl 32 ------- Read Fixed Length Memory
——→SS 33

Cl 33 ------- Gate ZERO to Fixed Length Memory Data Register
——→SS 34

Cl 34 ------- Write Fixed Length Memory (zero back in)
——→SS 17

Cl 50 ------- Gate Question Word Address Register (right hand) to Memory Address Register of Fixed Length Memory
——→SS 51

Cl 51 ------- Read Fixed Length Memory
——→SS 52

Cl 52 ------- Gate ZERO to Fixed Length Memory Data Register
——→SS 53

Cl 53 ------- Write Fixed Length Memory
——→SS 54

Cl 54 ------- Increment Question Word Address Register (right hand)
——→SS 55

Cl 55 ------- Gate Question Word Address Register (right hand) to Memory Address Register of Fixed Length Memory
——→SS 56

Cl 56 ------- Read Fixed Length Memory
——→SS 57

Cl 57 ------- Gate ZERO to Fixed Length Memory Data Register
——→SS 58

Cl 58 ------- Write Fixed Length Memory
——→SS 17

Cl 60 ------- Gate Question Word Address Register (right hand) to Memory Address Register of Fixed Length Memory
——→SS 61

Cl 61 ------- Read Fixed Length Memory
——→SS 62

Cl 62 ------- Decrement Fixed Length Memory Data Register
——→SS 63

Cl 63 ------- Write Fixed Length Memory
——→SS 17

Cl 80 ------- Gate Question Word Address Register (right hand) to Memory Address Register of Fixed Length Memory
——→SS 81

Cl 81 ------- Read Fixed Length Memory
——→SS 82

Cl 82 ------- Decrement Fixed Length Memory Data Register (now on "string found" logic Results Register location 1017, etc.)
——→SS 83

Cl 83 ------- Test Fixed Length Memory Data Register
if zero ——→SS 89
if not zero ——→SS 90

Cl 89 ------- Reset F.F. 17 to "0"
——→SS 17

Cl 90 ------- Increment Question Word Address Register (left hand)
——→SS 5

Cl 100 ------ Increment Question Word Address Register (right hand)
——→SS 101

Cl 101 ------ Gate Question Word Address Register (right hand) to Memory Address Register of Fixed Length Memory
——→SS 102

Cl 102 ------ Read Fixed Length Memory
——→SS 103

Cl 103 ------ Decrement Memory Address Register of Fixed Length Memory
——→SS 104

Cl 104 ------ Reset F.F. 17 to "0"
Write Fixed Length Memory
——→SS 16

Cl 111 ------ Gate result address table constants to Memory Address Register of Fixed Length Memory and to Memory Address Register Compare Register
Reset Criteria Found Register to 0
——→SS 112

Cl 112 ------ Read Fixed Length Memory
——→SS 113

Cl 113 ------ Test Fixed Length Memory Data Register
if on zero ——→SS 140
if not on zero ——→SS 114

Cl 114 ------ Increment Memory Address Register of Fixed Length Memory
——→SS 115

Cl 115 ------ Read Fixed Length Memory
——→SS 116

Cl 116 ------ Test Fixed Length Memory Data Register
(NOT)   if on zero ——→SS 145
if not on zero ——→SS 117

Cl 117 ------ Increment Memory Address Register of Fixed Length Memory
——→SS 118

Cl 118 ------ Increment Memory Address Register of Fixed Length Memory
——→SS 119

Cl 119 ------ Read Fixed Length Memory
——→SS 120

Cl 120------ Test Fixed Length Memory Data Register
(AND)   if on zero——→SS 155
if not on zero——→SS 121

| | |
|---|---|
| Cl 121 | Increment Memory Address Register of Fixed Length Memory<br>⟶SS 122 |
| Cl 122 | Increment Memory Address Register of Fixed Length Memory<br>⟶SS 123 |
| Cl 123 | Read Fixed Length Memory<br>⟶SS 124 |
| Cl 124 | Test Fixed Length Memory Data Register<br>if on zero⟶SS 160<br>if not on zero⟶SS 125 |
| Cl 125 | Increment Memory Address Register of Fixed Length Memory<br>⟶SS 126 |
| Cl 126 | Compare Memory Address Register of Fixed Length Memory with Memory Address Register Compare Register<br>if equal⟶SS 130<br>if Memory Address Register is less<br>⟶SS 127 |
| Cl 127 | Read Fixed Length Memory<br>⟶SS 128 |
| Cl 128 | Test Fixed Length Memory Data Register<br>if on zero⟶SS 160<br>if not on zero⟶SS 125 |
| Cl 130 | Increment Memory Address Register of Fixed Length Memory<br>⟶SS 131 |
| Cl 131 | Read Fixed Length Memory<br>⟶SS 132 |
| Cl 132 | Compare Fixed Length Memory Data Register with Criteria Found Register<br>if Criteria Found Register is equal to or greater than Fixed Length Memory Data Register<br>⟶SS 140<br>if Criteria Found Register is less than Fixed Length Memory Data Register⟶SS 145 |
| Cl 140 | Set criteria F.F. to "1"<br>⟶SS 141 |
| Cl 141 | Compare Questions Count Counter with Number of Questions Register<br>if equal⟶END<br>if not equal⟶SS 150 |
| Cl 145 | Set criteria F.F. to "0"<br>⟶SS 141 |
| Cl 150 | Increment Questions Count Counter<br>⟶SS 17 |
| Cl 155 | Increment Criteria Found Register<br>⟶SS 121 |
| Cl 160 | Increment Criteria Found Register<br>⟶SS 125 |

DESCRIPTION OF FLOW CHART OF FIGURE 6

The various operation sequences of the Information Retrieval system of the present invention are clearly illustrated in FIGURE 6 (i.e., FIGURES 6A through 6D). It will be noted that each block is labeled in the upper section thereof with the appropriate clock step numbers. In the lower section of the block there appears a functional statement of the operation performed by the particular indicated clock sequences. By proceeding through the flow chart it is possible to determine the manner in which various sequences of operations are performed by the present system. Branch points are clearly indicated by the output lines from different boxes and the condition which determines the branch is indicated by the notes relating to the output lines. As will be noted, some of the boxes are only one clock step while others are three, four or more. However, their function is clearly indicated in the functional description within the blocks. Reference to the TIMING SEQUENCE CHART will specify all of the operations performed by the particular clock sequences.

It will be noted that a dotted line passes down generally through the middle of FIGURE 6A and between FIGURES 6B and 6D. The portion of the flow diagram included on the right hand portion of FIGURE 6A and FIGURE 6B constitutes that portion of the flow sequences which are utilized primarily to perform the termination or tabulation of search results whereby the criteria flip-flop for a particular question will be set to a "1" meaning successful search or a "0" meaning an unsuccessful search. The remainder of the blocks of the flow diagram are devoted primarily to the performance of the search routine including the actual word comparisons between the question and the text words and also for performing the test to determine what sort of logic operations are being called for by particular search questions. As stated previously with respect to the logical schematic diagram of FIGURES 2A through 2E, there is a good deal of functional overlapping of the various clock stages as well as in the apparatus itself since the basic hardware and accessing routines for performing memory cycles and also logic decoding operations may be performed by the same hardware, therefore, it will be noted by referring briefly to, for example, FIGURE 2C and FIGURE 2D, many of the memory cycles may be initiated by clock stages in both the searching portions of the System Clock and by clock stages in the termination or result tabulation sections of the system. It will further be noted that the output of the block in the lower left hand corner of FIGURE 6B, indicated as Cl 150, branches back into clock stage 17 upon the termination of the tabulation procedure for a given question.

Referring specifically to that portion of FIGURE 6 (6A through 6D) referred to as the tabulation area, the flow branches for handling an ABSOLUTE YES, a NOT, and the other more general match conditions is clearly indicated. For example, the occurrence of an ABSOLUTE YES or a NOT will be seen to directly set the criteria flip-flop to a "1" and initiate the clock Cl 145. Similarly, the steps for proceeding through the remainder of the logic tables and incrementing the Criteria Found Register, comparing against the looked for criteria and finally, setting the criteria flip-flop as appropriate is clearly set forth.

Similarly, in the remainder of the flow chart for performing the search operations and special logic operations, more important steps are clearly illustrated and set forth in the blocks of said flow chart. In the block marked Cl 2, 3, 4, 4A, the routine for obtaining a new question word address is set forth. In the block marked Cl 4B, 4C, 4D, the steps of examining and decoding the logic operators for each question word is set forth. The block marked Cl 9, 10, 11, indicates that portion of the process for obtaining consecutive text word addresses. The two blocks marked Cl 5, 6, 7, and Cl 12, 13, set forth the steps for taking the previously mentioned question word address and text word address and obtaining said question and text words character by character. The block Cl 14 is that block which initiates the matching logic and also the branches to appropriate logic routines. Thus, this clock stage constitutes one of the major branch points in the system.

The remainder of the search section of the flow chart appearing primarily on FIGURES 6C and 6D contains those logic steps which cause the results of matches to be stored in the logic tables and also, initiates the special sequences for storing results in the Results Register and branching to various searching sequences depending upon the logic encountered. It will be noted that the STRING logic sequences branch out of the test made at Cl 14 at the branches marked 14E and 14F. The tests for the other logic operations cause branches at the block marked Cl 30. It is believed that the specific branching and steps performed in the flow of the searching operations are clearly set forth and that the sequences which are initiated in the event of the various logic and search contingencies are clearly apparent from this flow chart. If it is desired to determine the exact system steps called for by any of the functional blocks of FIGURE 6, references may be made to the Timing Sequence Chart wherein the specific operations are set forth item by item.

The following is a description of the operation of the system referring to the preceding Timing Sequence Chart and also to the logical schematic diagram of FIGURES 2A through 2E. The following description will be enhanced by occasional reference to the flow diagram of FIGURE 6 and its description wherein the stated function of various clock stage sequences will make readily apparent the operation being performed by a given set or sub-set of timing pulses.

In order to initiate a search operation, as stated previously, it is first necessary to load the Fixed Length Memory with the alphabetized list of addresses of the questions together with the logic operation numbers associated therewith, the alphabetized list of addresses of the text words and finally, the logic information to be initially stored in the logic Results Register. Further, the Variable Length Memory is loaded with the question words together with their length indicators and word separators and also, the text words together with their length indicators in their normal or original text form. Additionally, the actual number of questions for a given search run must be entered in the Number of Questions Register on FIGURE 2E. Another method of indicating the end of all questions could be an additional special symbol together with appropriate recognition circuitry.

The start or initiation pulse causes clock pulse 1 to reset the Question Count Counter to 1, reset the Question Word Counter to 0, reset the Text Word Counter to 100 and reset flip-flops 17, 03, 02 and 00 to "0." The turn off initiates clock stage 2. Clock stage 2 provides a pulse to gate 52 and gates the current contents of the Question Word Counter to the Memory Address Register of the Fixed Length Memory, Clock stage 2 in turning off initiates clock stage 3. Clock stage 3 reads the Fixed Length Memory and causes its contents to be placed in the associated Data Register and in turning off, initiates clock stage 4. Clock stage 4 gates the contents of the Data Register to the Question Word Address Register through the gate circuit 62. The turn off of clock stage 4 initiates clock stage 4A. Clock stage 4A is applied to gate 74 and tests to see if the logic operator #19 is currently in the right hand portion of the Question Word Address Register. If the logic operator #19 is not present, it sets flip-flop 75 to a "1" through inverter 77, branching the system through gate 76 to clock stage 4B and if the logic operator #19 is present, it sets the flip-flop 75 to a "0" and branches the system to clock stage 111.

Clock stage 4B gates the address in the right hand portion of the Question Word Address Register to the Memory Address Register of the Fixed Length Memory through OR circuit 72 and gate 73 and on turning off, initiates clock stage 4C. Clock stage 4C causes another re-cycle of the Fixed Length Memory and on turning off, initiates clock stage 4D. Clock stage 4D initiates gate 98 to set its associated criteria satisfied flip-flop to a "0" or a "1" depending on whether a zero does or does not exist in the Data Register at this time. The fall of clock stage 4D is applied to gate 99 which causes either clock stage 5 or clock stage 17 to be initiated.

Assuming the fall of clock stage 4D initiates clock stage 5, the turn on pulse of this stage is applied to gate 70 and gates the Question Word Address Register to the Memory Address Register of the Variable Length Memory and the turn off of stage 5 initiates clock stage 6. Clock stage 6 causes a read cycle of the Variable Length Memory and then initiates clock stage 7. The turn on pulse of clock stage 7 is applied to gate 122 which gates the question word character to the Question Word Compare Register. The turn off pulse of clock stage 7 is applied to gate 86 which tests the condition of flip-flop 17. If the flip-flop is on a "1," the system will branch to clock stage 12 and if on a "0" it will branch to clock stage 9.

Assuming the flip-flop 17 is on a "0" and clock stage 9 is energized, the turn on pulse of clock stage 9 is applied to gate 54 which places the contents of the Text Word Counter in the Memory Address Register of the Fixed Length Memory and on turning off, initiates clock stage 10. Clock stage 10 causes a read cycle of the Fixed Length Memory thus placing a text word address in the Data Register and on turning off, initiates clock stage 11. Clock stage 11 is applied to gate 78 to gate the address in the Data Register of the Fixed Length Memory to the Text Word Address Register and on turning off, initiates clock stage 12. The turn on of clock stage 12 applies a pulse to gate 84 thus transferring the contents of the Text Word Address Register in the Memory Address Register of the Variable Length Memory. The turn off of clock stage 12 initiates clock stage 13 which in turning on initiates a "read" cycle of the Variable Length Memory and on turning off initiates clock stage 14. Clock stage 14 compares the Question Word Compare Register with the Variable Length Memory Data Register and with the word separator symbol ($). To do this the turn on of clock stage 14 is applied to gates 124 and 126 and, depending upon the results of the comparison, the system may branch to clock stages 29, 15, 16, 17, 80 or 100. To determine just what each branch condition is, reference is made to the Timing Sequence Chart for clock stage 14. Assuming that the system had branched to clock stage 15 on the turn off of clock stage 14 which was applied to gate 127, the turn on of clock stage 15 is applied to OR circuit 64 which increments the left hand portion of the Question Word Address Register and also increments the Text Word Address Register. The turn off of clock stage 15 returns to clock stage 5 and the previous cycle beginning with that clock stage is repeated. Assuming that clock stage 14 had caused a branch to single shot 16, single shot 16 on turning on would increment the Text Word Counter and on turning off, returns to clock stage 2. Assuming that clock stage 14 had caused a branch to clock stage 17, this stage on turning on increments the Question Word Counter and also returns to clock stage 2.

Assuming that clock stage 14 had caused the system to branch to clock stage 29, the turn on pulse from this clock stage resets flip-flops 00, 02, 03 and 17 to a "0" and on turning off, initiates clock stage 30. Clock stage 30 tests the Logic Decoder output and branches to either of clock stages 31, 50, 60 or 80 depending upon the criteria satisfied as listed in the Timing Sequence Chart. Assuming that the system branches to clock stage 31, due to the output on the appropriate line from gate 53 on the occurrence of the turn off pulse of clock stage 30 which is applied to said gate circuit, the turn on pulse of clock stage 31 is applied to OR circuit 72 and gate 73 to gate the contents of the right hand portion of the Question Word Address Register to the Memory Address Register of the Fixed Length Memory and on turning off initiates clock stage 32. The turn on pulse of clock stage 32 causes a read cycle of the Fixed Length Memory and on turning off, initiates clock stage 33. The turn on of clock stage 33 is applied to OR 92 and gate 93 to gate a ZERO to the Fixed Length Memory Data Register and on turning off, initiates clock stage 34. The turn on of clock stage 34 is applied to OR circuit 60 which causes a "write" cycle in the Fixed Length Memory and the turn off of clock stage 34 returns the system to clock stage 17.

Assuming now that the test made during clock stage 30 had initiated clock stage 50, the turn on of this stage is applied to OR circuit 72 and gate 73 to gate the right hand portion of the contents of the Question Word Address Register to the Memory Address Register of the Fixed Length Memory and on turning off, initiates clock stage 51. The turn on of clock stage 51 initiates a "read" cycle for the Fixed Length Memory and on turning off, initiates clock stage 52. The turn on of clock stage 52 gates a ZERO through gate 93 into the Data Register of the Fixed Length Memory and initiates clock stage 53. Clock stage 53 initiates a write cycle in the Fixed Length Memory and on turning off, initiates clock stage 54. The turn on of clock stage 54 increments the right hand portion of the Question Word Address Register through OR circuit 56 and on turning off, initiates clock stage 55. The turn on of clock stage 55 is applied through OR circuit 72 and gate 73 to gate the contents of the Question Word Address Register to the Memory Address Register of the Fixed Length Memory and on turn off, initiates clock stage 56. The turn on of clock stage 56 initiates a "read" cycle of the Fixed Length Memory and on turn off, initiates clock stage 57 which on turn on gates a ZERO to the Fixed Length Memory Data Register and on turn off, initiates clock stage 58. The turn on of clock stage 58 causes a write cycle of the Fixed Length Memory and upon turning off, returns the system back to clock stage 17.

Assuming now that the tests made in clock stage 30 had initiated clock stage 60, the turn on of this stage is applied to OR circuit 72 and gate 73 to gate the contents of the right hand portion of the Question Word Address Register to the Memory Address Register of the Fixed Length Memory and on turning off, initiates clock stage 61 whose turn on initiates a "read" cycle of the Fixed Length Memory and on turn off, initiates clock stage 62. The turn on of clock stage 62 is applied to OR circuit 88 and causes a decrement of 1 of the Data Register of the Fixed Length Memory and on turning off, initiates clock stage 63 whose turn on initiates a write cycle of the Fixed Length Memory and whose turn off returns the system again to clock stage 17.

Assuming now that the last test enumerated under clock stage 30 is met and clock cycle 80 is initiated, the turn on of clock stage 80 is applied to OR circuit 72 and gate 73 to again gate the contents of the right hand portion of the Question Word Address Register to the Memory Address Register of the Fixed Length Memory and on turning off, initiates clock stage 81 whose turn on initiates a "read" cycle of the Fixed Length Memory and whose turn off initiates clock stage 82. The turn on of clock stage 82 is applied to OR circuit 88 which decrements the Data Register of the Fixed Length Memory and on turning off, initiates clock stage 83. The turn on of clock stage 83 is applied to gate circuit 100 and tests the contents of the Data Register of the Fixed Length Memory to see if they are a zero or not a zero. The fall of clock stage 83 is applied to gate circuit 101 and if the associated flip-flop indicates a "0" in the Data Register, clock stage 89 is initiated. Clock stage 89 on turning on applies a pulse to OR circuit 80 and resets flip-flop 17 to a "0" and on turning off, returns to clock stage 17.

Assuming that the tests made during clock stage 83 indicated that the number in the Data Register had not been a zero and clock stage 90 is initiated, the turn on of clock stage 90 is applied to OR circuit 64 to increment the left hand portion of the Question Word Address Register and on turning off, returns the system back to clock stage 5.

The next clock cycle is clock cycle 100 which is initiated by the last test enumerated under clock stage 14. The turn on of clock stage 100 is applied to OR circuit 56 to increment the Question Word Address Register and on turn off, initiates clock stage 101. The turn on of clock stage 101 is applied to OR circuit 72 and gate 73 to gate the contents of the right hand portion of the Question Word Address Register to the Memory Address Register of the Fixed Length Memory. The turn off of clock stage 101 initiates clock stage 102 whose turn on causes a read cycle of the Fixed Length Memory and whose turn off in turn initiates clock stage 103. The turn on of clock stage 103 decrements the Memory Address Register of the Fixed Length Memory and on turning off, proceeds to clock stage 104. The turn on of clock 104 is applied to OR circuit 80 and again resets the flip-flop 17 to a "0" and returns the system to clock stage 16.

Clock stage 111 is initiated by a test made during clock cycle 4A where a test is made to see if the current question word contains the logic indicator #19 which is used to indicate the end of a particular question. If this test is positive, it indicates that a particular question is finished and that the Results Register is to be examined to see if the question has been satisfactorily answered. The system then branches directly to clock stage 111. The turn on of clock stage 111 is applied to gate 112 which initiates a gate 30 to gate the result address table constants #1018 and #1000 to the MAR Comparison Register and the Memory Address Register of the Fixed Length Memory respectively. The turn on of clock pulse 111 is also applied to reset the Criteria Found Register to a 0 and on turning off, initiates clock stage 112. The turn on of clock stage 112 initiates a read cycle of a Fixed Length Memory beginning in this case with the logic indicator address #1000 and on turning off, initiates clock stage 113. The turn on of clock stage 113 is applied to gate 102 to test the contents of the Data Register of the Fixed Length Memory. Depending upon whether or not a zero is stored in said Data Register, the associated criteria satisfied flip-flop will be set to a "1" or a "0." The turn off pulse of clock stage 113 is applied to gate 103 which branches to either clock stage 140 or 114 depending upon the setting of said flip-flop. Assuming that there was not a zero stored in the Data Register, the system branches to clock stage 114 whose turn on pulse is applied to OR circuit 90 which increments the Memory Address Register of the Fixed Length Memory and on turn off, initiates clock stage 115. The turn on of clock stage 115 initiates a "read" cycle of the Fixed Length Memory and upon turn off, initiates clock stage 116. The turn on pulse of clock stage 116 is applied to gate 104 which tests the contents of the Data Register of the Fixed Length Memory to see if a zero is stored therein. Depending upon the contents of said Data Register, the system then branches to clock stage 145 or 117. Assuming that a zero was not therein and clock stage 117 is initiated, the turn on of said stage is applied to OR circuit 90 which incremented the Memory Address Register of the Fixed Length Memory and on turn off, initiates clock stage 118. The turn on pulse of clock stage 118 is applied to OR circuit 90 to increment the Memory Address Register of the Fixed Length Memory and on turn off, initiates clock stage 119 which initiates a "read" cycle of the Fixed Length Memory and on turn off, initiates clock stage 120. The turn on of clock stage 120 is applied to gate circuit 106 to test the contents of the Data Register of the Fixed Length Memory and depending upon whether or not a zero is present therein, the system branches to clock stage 155 or 121 on the turn off pulse which is applied to clock 107.

Assuming that the number stored in the Data Register and clock stage 121 is initiated, the turn on of this stage increments the Memory Address Register of the Fixed Length Memory through OR circuit 90. This turn off initiates clock stage 122. The turn on of clock stage 122 again increments the Memory Address Register of the Fixed Length Memory and on turn off, initiates clock stage 123 whose turn on initiates a read cycle of the Fixed Length Memory. The turn on of clock pulse 124 is applied to gate circuit 108 which tests the contents of the Data Register for the existence of a zero therein. Depending upon the contents of the Data Register, the system will branch to clock stage 160 or 125 as indicated in the Timing Sequence Chart.

Assuming that there is no zero stored in the Data Register, the system branches to clock stage 125 whose turn on again increments the Memory Address Register of the Fixed Length Memory through OR circuit 90 and on turn off, initiates clock stage 126. Turn on of clock stage 126 is applied to gate circuit 110 which compares the contents of the Memory Address Register of the Fixed Length Memory with the MAR Comparison Register. If these two numbers are equal, the system branches to clock stage 130 and if the Memory Address Register is less, the system branches to clock stage 127.

Assuming first that the contents of the Memory Address Register are less and clock stage 127 is initiated, the turn on of this stage initiates a read cycle of the Fixed Length Memory and on turn off, initiates clock stage 128. The turn on of clock stage 128 is applied to gate circuit 108 to compare the contents of the Data Register with the ZERO block. If on zero, the system branches to clock stage 160 and if not zero, returns to clock stage 125.

Returning now briefly to clock stage 126 in the Timing Sequence Chart, it will be noted that if the contents of the Memory Address Register of the Fixed Length Memory had agreed with the MAR Comparison Register, the system would have branched to clock stage 130. Assuming this condition is now met, clock stage 130 on turning on increments the Memory Address Register of the Fixed Length Memory and on turning off, initiates a clock stage 131. The turn on of clock stage 131 initiates a read cycle of the Fixed Length Memory and proceeds to clock stage 132. The turn on of clock stage 132 is applied to gate circuit 94 which compares the contents of the Criteria Found Register with the Data Register of the Fixed Length Memory. If the contents of the Criteria Found Register are equal to or greater than that of the Data Register, the system transfers to clock stage 140 and if less, transfers to clock stage 145. Assuming the former condition and the system initiates clock stage 140, on the fall of clock stage 132 which is supplied to gate 96, the turn on of clock stage 140 sets the criteria flip-flop for the particular number stored in the Question Count Counter to a "1" which indicates that the criteria for this particular question has been successfully met by the particular data base in memory. Clock stage 140 on turning off, initiates clock stage 141. The turn on of clock stage 141 is applied to gate 118 which compares the contents of the Question Count Counter with the Number of Questions Register. If equal, the system gives the signal "END" which indicates that the particular Information Retrieval operation has been terminated and all of the questions in the system have been answered and all the results evaluated and tabulated in the criteria flip-flops. If the number in the Question Count Counter is not equal, however, the system branches to clock stage 150. The turn on of clock stage 150 increments the Question Count Counter and on turn off, branches the system back to clock stage 17 which begins the accessing of another question.

Returning now briefly to the Timing Sequence Chart for clock stage 16, it will be noted that if the Data Register had contained a zero, the system would have branched to clock stage 145 which, it will be assumed, is now being done. The turn on of clock stage 145 is applied to gate circuit 116 which sets the appropriate criteria flip-flop to a "0" which indicates that an unsuccessful match for the particular question was obtained. The turn off of 145 returns the system back to clock stage 141.

Referring once more to the Timing Sequence Chart, at clock stage 120, it will be noted, if the Data Register had contained a zero, the system would have branched to clock stage 155. The turn on of 155 increments the Criteria Found Register and on turn off, returns the system again to clock stage 121.

Referring again to the Timing Sequence Chart at clock stage 124, it will be noted that if on this stage the Data Register had contained a zero, the system would have branched to clock stage 160. The turn on of clock stage 160 increments the Criteria Found Register and returns the system to clock stage 125. The description of clock stage 160 thus completes a description of the operation of the system relating to the Timing Sequence Chart and the logical schematic diagram of FIGURES 2A through 2E. It will thus be noted that the major components of this system operate in essentially the same way for many different system operations. However, the particular sequence of operations is controlled by the System Clock and various tests are made against the logic data stored in the Results Register and also the comparison results, which tests control subsequent branching of the system to other control routines.

The previous description of FIGURE 6, when considered with the above description of the Timing Sequence Chart relative to the logical schematic diagram, should clearly explain the detailed operations of the system and the specific manner in which various functional operations indicated in FIGURE 6 are performed. The following example is presented in order to illustrate the operation of the disclosed embodiment of the Information Retrieval system and does not go into the detailed operations of the various components of the system as this would be needlessly involved and in view of the above description of the Timing Sequence Chart, is manifestly unnecessary. However, a description of the operations stated in functional language as various comparisons are made with the question against the data base will suffice to explain the operation of the system for all major operating conditions.

The following tables illustrate the contents of both the Fixed Length Memory and the Variable Length Memory after the inputing operation. It should be noted that the contents of the memory are written in non-coded form, i.e., the alpha-numeric characters as well as numbers are written out. It is to be understood that in memory they would of course be stored in binary form, the logic indication numbers themselves being written in binary coded decimal (BCD) as described previously with respect to the Decoder of FIGURE 3.

TABLE I.—EXAMPLE—QUESTIONS

[Question 1 (Information Retrieval)]

| Logic Operator | Words |
|---|---|
| 1000 (ABSOLUTE YES) | PRIME |
| 1001 (NOT) | SDI |
| 1003 (AND) | Technicla (and) Information |
| 1006 (OR) | Text (or) Indexing |
| 1008 (Single Words) | Centralization |
| 1009 (Single Words) | Documentation |
| 1010 (Single Words) | Literature |
| 1011 (Single Words) | Searches |
| 1018 (STRING) | Information Retrieval |
| 1019 (Criteria Requested, 4) | |

[Question 2 (Image Storage)]

| | |
|---|---|
| 1020 (ABSOLUTE YES) | Gutenberg |
| 1023 (AND) | IBM (and) Microprocessing |
| 1026 (OR) | Microfilm (or) Microprocessing |
| 1038 (STRING) | Image Storage |
| 1039 (Criteria Requested, 4) | |

[Question 3 (Literary Analysis)]

| | |
|---|---|
| 1042 (CONDITIONAL AND) | Literary (and) Analysis |
| 1058 (STRING) | To be or not to be |
| 1059 (Criteria Requested, 1) | |

DATA BASE

Prime is merely an acronym which is planning through retrieval of information for management extrapolation.

TABLE II.—ALPHABETIZED QUESTION WORD ADDRESS LIST AND ASSOCIATED LOGIC OPERATORS IN FIXED LENGTH MEMORY

| Address in Fixed Length Memory | 0 | 0 | 0 | 0 | 0 | 0 | 0 | 0 | 0 | 0 | 0 | 0 |
|---|---|---|---|---|---|---|---|---|---|---|---|---|
| | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 1 | 1 |
| | 0 | 1 | 2 | 3 | 4 | 5 | 6 | 7 | 8 | 9 | 0 | 1 |
| Contents of Memory | 0 | 0 | 0 | 0 | 0 | 0 | 0 | 0 | 0 | 0 | 0 | 0 |
| | 0 | 0 | 0 | 0 | 1 | 0 | 0 | 0 | 1 | 0 | 0 | 0 |
| | 0 | 4 | 0 | 4 | 0 | 1 | 9 | 2 | 1 | 7 | 5 | 0 |
| | 8 | 0 | 0 | 7 | 4 | 4 | 1 | 6 | 5 | 5 | 8 | 0 |
| | 1 | 1 | 1 | 1 | 1 | 1 | 1 | 1 | 1 | 1 | 1 | 1 |
| | 0 | 0 | 0 | 0 | 0 | 0 | 0 | 0 | 0 | 0 | 0 | 0 |
| | 0 | 0 | 0 | 0 | 1 | 0 | 1 | 0 | 1 | 0 | 0 | 1 |
| | 1 | 6 | 0 | 6 | 1 | 3 | 0 | 3 | 8 | 9 | 8 | 9 |

TABLE III.—ALPHABETIZED TEXT WORD ADDRESS LIST IN FIXED LENGTH MEMORY

| Address in Fixed Length Memory | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| | 1 | 1 | 1 | 1 | 1 | 1 | 1 | 1 | 1 | 1 | 1 | 1 | 1 | 1 | 1 |
| | 0 | 0 | 0 | 0 | 0 | 0 | 0 | 0 | 0 | 0 | 1 | 1 | 1 | 1 | 1 |
| | 0 | 1 | 2 | 3 | 4 | 5 | 6 | 7 | 8 | 9 | 0 | 1 | 2 | 3 | 4 |
| Contents of Memory | 2 | 2 | 2 | 2 | 2 | 2 | 2 | 2 | 2 | 2 | 2 | 2 | 2 | 2 | 2 |
| | 0 | 0 | 0 | 0 | 0 | 0 | 0 | 0 | 0 | 0 | 0 | 0 | 0 | 0 | 1 |
| | 1 | 0 | 3 | 7 | 9 | 0 | 3 | 1 | 2 | 5 | 4 | 6 | 9 | 7 | 0 |
| | 9 | 7 | 9 | 3 | 0 | 0 | 2 | 1 | 3 | 3 | 3 | 2 | 5 | 7 | 7 |

TABLE IV.—LOGIC RESULTS REGISTER CONTENTS IN FIXED LENGTH MEMORY BEFORE SEARCH

| Address in Fixed Length Memory | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 1 | 1 | 1 | 1 | 1 | 1 | 1 | 1 | 1 | 1 |
| | 0 | 1 | 2 | 3 | 4 | 5 | 6 | 7 | 8 | 9 | 0 | 1 | 2 | 3 | 4 | 5 | 6 | 7 | 8 | 9 |
| Logic | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | 0 | 0 |
| | 1 | 1 | 1 | 2 | 1 | 1 | 1 | 1 | 1 | 1 | 1 | 1 | 1 | 1 | 1 | 1 | 1 | 1 | 2 | 4 |

TABLE V.—QUESTION WORDS IN NORMAL TEXT FORM IN VARIABLE LENGTH MEMORY, 0000→1099
(Starting at address 0000)

| Address in Variable Length Memory | 0 | 0 | 0 | 0 | 0 | 0 | 0 |
|---|---|---|---|---|---|---|---|
| | 0 | 0 | 0 | 0 | 0 | 0 | 0 |
| | 0 | 0 | 1 | 2 | 4 | 4 | 5 |
| | 0 | 8 | 4 | 6 | 0 | 7 | 8 |
| Contents of Variable Length Memory | 05PRIME$03SDI$09TECHNICAL$11INFORMATION$04TEXT$08INDEXING$14CENTRALIZATION$ |
| Address in Variable Length Memory | 0 | 0 | 0 | 0 | 0 |
| | 0 | 0 | 1 | 1 | 1 |
| | 7 | 9 | 0 | 1 | 2 |
| | 5 | 1 | 4 | 5 | 9 |
| Contents of Variable Length Memory | 13DOCUMENTATION$10LITERATURE$08SEARCHES$11INFORMATION$09RETRIEVAL$ |

TABLE VI.—TEXT WORD LIST IN NORMAL TEXT FORM IN VARIABLE LENGTH MEMORY, 2000→9999

| Address in Variable Length Memory | 2 | 2 | 2 | 2 | 2 | 2 | 2 | 2 | 2 | 2 |
|---|---|---|---|---|---|---|---|---|---|---|
| | 0 | 0 | 0 | 0 | 0 | 0 | 0 | 0 | 0 | 0 |
| | 0 | 0 | 1 | 1 | 2 | 3 | 3 | 4 | 5 | 6 |
| | 0 | 7 | 1 | 9 | 3 | 2 | 3 | 9 | 3 | 2 |
| Contents of Variable Length Memory | 05PRIME02IS06MERELY02AN07ACRONYM05WHICH02IS08PLANNING07THROUGH09RETRIEVAL |
| Address in Variable Length Memory | 2 | 2 | 2 | 2 | 2 |
| | 0 | 0 | 0 | 1 | 1 |
| | 7 | 7 | 9 | 0 | 2 |
| | 3 | 7 | 0 | 5 | 7 | 2 |
| Contents of Variable Length Memory | 02OF11INFORMATION03FOR10MANAGEMENT13EXTRAPOLATION99 |

TABLE VII.—LOGIC RESULTS REGISTER CONTENTS IN FIXED LENGTH MEMORY AFTER SEARCH

| Address in Fixed Length Memory | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 1 | 1 | 1 | 1 | 1 | 1 | 1 | 1 | 1 | 1 |
| | 0 | 1 | 2 | 3 | 4 | 5 | 6 | 7 | 8 | 9 | 0 | 1 | 2 | 3 | 4 | 5 | 6 | 7 | 8 | 9 |
| Logic | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | 0 | 0 |
| | 0 | 1 | 1 | 1 | 1 | 1 | 1 | 1 | 1 | 1 | 1 | 1 | 1 | 1 | 1 | 1 | 1 | 1 | 2 | 4 |

Table I states the search example. It will be noted that three questions are shown illustrating the special logic operators as well as the words themselves. It is to be understood, however, that only question #1 will be described in the present examples. Questions #2 and #3 are presented merely to illustrate other types of questions which could be asked against typical data bases. The data base illustrated in the lower part of the Table is obviously a very short and simple statement which is to be searched relative to question #1. Table II illustrates the actual Fixed Length Memory contents in that portion of the memory devoted to storage of the actual question word list and the logic operators which accompany the individual question words. It will be noted that the last question word at the address 0011 contains the "end of question" indicator which, as described previously, is 1019. It will also be noted that only the first word of the STRING or the address 0008 contains the STRING operator 1018. Thus, the second word of the STRING in the question does not appear in the alphabetized question list, as was described previously.

Table III illustrates the alphabetized text word address list as stored in the Fixed Length Memory at addresses 100 to 1000. It will be noted that this list of addresses starts at address 100 in the Fixed Length Memory, as was described previously. This list of text words only includes the addresses as obviously no logic is to be carried along with the text words themselves. Table IV illustrates the contents of the logic Results Register in the Fixed Length Memory for the first question illustrated in the examples. As described previously, Fixed Length Memory addresses 1000 through 1019 are the designated storage locations for the result tables or Results Register for the first question. It will be noted that all of the storage locations in this logic table have been pre-loaded to contain the proper numbers for performing the required question.

Table V is a list of the question words in their normal form as stored in the Variable Length Memory. It will be noted that these words, as stored in the Variable Length Memory, contain as their first two left hand characters the word length designation and as the last or right hand character the "end of question word" symbol ($). It will further be noted that these words are stored consecutively in the Variable Length Memory beginning with address 0000 since it was indicated that the storage locations allocated for question words are from 0000 to 1999.

Table VI illustrates the contents of that section of the Variable Length Memory devoted to the storage of the text word list in normal text form. It will be noted that in the case of the text word list, each word contains as its first two left hand characters the word length indicators. And further, that this list of text words begins at the address 2000 which was indicated as the beginning of that portion of the Variable Length Memory which would be devoted to the storage of the text words or data base.

Referring now to the specific example and assuming that the machine has started an operation, the first operation is the accessing of the first question word which, as will be seen, would be the word SDI. The address of this question word is brought out of the Fixed Length Memory together with its logic indicator which is a NOT or a 1001. The first thing that is done is the address 1001 in the Fixed Length Memory is examined to determine if it is on a 0. Since it is not, having been set to a 1, the system begins comparing words in the data base and starts accessing words. The first word access from the data base is AN and since it is a two character word, will be rejected and the next word in the data base examined. The word IS is also a two character word and is likewise rejected. The same comparison continues until the word FOR is encountered and since this word is also a three letter word, the comparison continues until the first actual alphanumeric character F. Since this letter is earlier in the alphabet than S, the next data word is again extracted.

This is the five character word PRIME. Now, however, the system detects that the number 05 is greater than a number 03 and that, therefore, no three character word can exist in the data base and therefore, starts accessing question words. The next question word is the word TEXT which results in the same mis-match and requires the accessing of the next question word which is the word PRIME.

It should be noted that each time a new question word accessed, the logic result tables are interrogated to see the logic for that particular word has already been satisfied before attempting to continue with the actual word comparison.

The system will proceed with the comparison of the words PRIME in both the question and in the text and the comparison will continue satisfactorily until the question word separator ($) is detected in the question. The system then makes a test to see if this word is part of a STRING and if not, it accesses the logic Results Register and stores a 0 in same and returns the 0 to memory at the address location 1000 in the Fixed Length Memory which is the result table address for an ABSOLUTE YES.

Having done this, the system proceeds to the next question word which is the eight character word INDEXING, which indicates a logic operation OR. The test to see if the logic is satisfied is repeated and the comparison with the text words continues. The comparison continues against the text words and the words WHICH, MERELY ACRONYM, THROUGH, and PLANNING are compared without success. However, when the word PLANNING is accessed from the data base, the P is later in the alphabet than I and this mis-match causes the next question word to be accessed which is the eight character word SEARCHES. Although the number of characters are the same as PLANNING, the S is later in the alphabet than the P and the next text word is accessed which is RETRIEVAL. Since this word has more characters than SEARCHES, the next question word which is the nine character word TECHNICAL is accessed. The consequent mis-match causes the next data base word which is MANAGEMENT to be extracted and this mis-match causes the next question word LITERATURE to be accessed. Since MANAGEMENT is still further along in the alphabet than LITERATURE, the next question word is accessed which is INFORMATION. It will be noted that the first occurrence of INFORMATION is the one associated with the logical operator 1003 or AND. The successful comparison of the words INFORMATION in both the question words and the text words results in the decrementing of the number 2 stored at location 1003 in the logic result tables to a 1 which is shown in Table VII at this same address. After this has been done, the text word INFORMATION stays in the system and the next question word is accessed and compared against same. However, the next question word is again INFORMATION, however, this time the INFORMATION in the question word is the first word of a STRING. The appropriate system controls are set and the comparison continues and since it is successful, the next text word after INFORMATION in the normal text format in the Variable Length Memory is accessed and compared against the next word of the STRING in the Variable Length Memory which is RETRIEVAL. Since the word FOR and RETRIEVAL obviously do not compare, the particular STRING search fails and the system proceeds to gate out the next question word which is DOCUMENTATION. This word is compared against the text word INFORMATION which is still in the system and then the next text word which is EXTRAPOLATION. Subsequent comparison causes the next question word to be extracted which is CENTRALIZATION. This comparison also fails, the next question word is accessed and this time the special "end of question" operator #19 (which is the output of the Decoder when the numbers 1019, 1039, etc., are detected) is detected which causes the system to perform the termination or tabulation or results routine.

It is noted that the last word in the sample question was shorter than the last word in the text and thus, the "end of question" symbol #19 was properly accessed. However, if the last question word is longer than the last text word, some means must be used to force the "end of question" symbol #19 out. This may be taken care of by using the number 99 in the last text word. Since no word in common usage would have 99 characters, the occurrence of this number in the text word list automatically forces out the remaining question words until the "end of question" indicator.

During this operation this will be remembered, the logic tables are examined and zeros counted and compared against the criteria requested for the question. In this particular case, the word PRIME, as will be remembered, was an ABSOLUTE YES which has the logical effect of giving a forced match for the entire question and the way in which this condition is detected is by the fact that a 0 appears in the logic Results Register at the address 1000 which automatically causes the criteria flip-flop for that question to be set to a "1" which indicates that the question has been successfully answered. It will further be noted that the only other successful comparison of the question word against the data base was that one member of the two membered AND was found which resulted in the setting of a 2 at logic address 1003 to a 1. If the other member had been found, this member would have been set to a 0 and would have meant that one criteria for the question would have been found. However, none of the other words desired were found and had it not been for the ABSOLUTE YES match on the word PRIME, the question would not have been successfully answered.

The above example has been set forth in terms of functional language rather than a detailed description of every operation of the circuit as such would have been prohibitively lengthy and would serve no purpose since all of the operations have been clearly set forth with respect to the Timing Sequence Chart, the flow chart of FIGURE 6 and the detailed description of the operation of the circuit with respect to FIGURES 2A through 2E.

It is believed that with the above description of a specific search example, that the operation of the instant Information Retrieval system has been clearly set forth and that any person skilled in the electronic computing art would be capable of constructing an Information Retrieval system according to the teachings of the present invention.

The principles of this invention may be practiced not only by the specific apparatus herein disclosed as a preferred embodiment but also by other computers of both a specific and general purpose nature when controlled to operate, by means of a program for example, in accordance with principles of the invention.

Specifically, the method in which long word STRINGS or word adjacency searches are performed concurrently with standard single word matches and various assortments of logic searchers is believed to be a completely novel concept in the electronic data processing field. Further, the manner in which the data is organized in its original normal text form as a first data base section and in a list of alphabetized relative addresses organized according to word length relating to such clear text data as a second data base section is thought to be a completely different approach to the usual full concordance or alphabetizing schemes used with existing systems.

It is to be understood, however, that many of the particular disclosed forms of apparatus and organization illustrated in the present embodiment of the invention could be varied within the scope of the over-all system concept. For example, it would be possible to use a Fixed Field Length Memory in place of the Variable Field Length Memory disclosed. And although the information density in the memory might suffer, the system would still be fully operative and, in fact, many of the controls would be simplified.

Similarly, the particular timing system comprising the multistage single shot multivibrator clock could easily be replaced by some other more fully asynchronous system.

Also, the Compare Registers for comparing the various words and the questions against the memory might be altered in accordance with known comparison circuits in the art wherein words could be compared simultaneously or in parallel rather than by character by character and similar comparison results obtained.

The system is also ideally adapted to search any language, i.e., English, foreign, mathematical or in fact any language which can be represented by symbols, with virtually no modifications since both question and text words would obviously be expressed in said language and susceptible of searching by the disclosed techniques.

As will be apparent from the previous description, the same questions may be used for as many pre-processed data bases as desired. This might be especially important where it is desired to build up question files for certain areas. In this way question techniques may be continually improved and question thesauri improved.

The major step forward in the Information Retrieval art accomplished by the present invention is that it allows Information Retrieval operations to be run on normal or natural text material using normal or logical questioning techniques. The pre-processing done in preparing the data base is clerical or machine performable, i.e., alphabetizing and assigning word length indications. Missing are the requirements of a key word or abstracting input which requires highly skilled persons for performance. Thus, the present system represents a signicant step forward in the Information Retrieval area and makes machine searching an economically feasible process.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An Information Retrieval system for searching large quantities of an alpha-numeric data base predicated upon alpha-numeric word questions including:
   a first system storage area wherein the data is stored in original text form, each word of said data being separately addressable,
   means for determining the relative address of each word in said original data base,
   means for alpabetizing the data base together with the relative addresses,
   means for extracting only the relative addresses from said alphabetized list,
   means for storing said extracted address list in a second system storage area,
   means for storing an original text alpha-numeric question word group in its original format in a third storage area,
   means for assigning relative addresses to the words of said question word group,
   means for alphabetizing said question word group together with said relative addresses,
   means for extracting the relative addresses only from said alphabetized list of question words,
   means for storing said alphabetized list of addresses in a fourth system storage area,
   means utilizing the alphabetized list of relative addresses in said second and fourth storage system areas to extract question words and text words from said first and third storage areas,
   means for comparing the words so extracted for matches,
   means for storing an indication of successful matches in a fifth system storage area.

means responsive to reaching the end of a question word group to examine the results tabulated in said fifth system storage area, and means to determine whether a successful search against said data base has been accomplished.

2. An Information Retrieval system as set forth in claim 1 above including:

means for first grouping both said data base and said question word groups according to ascending word length and then alphabetizing same.

3. A system as set forth in claim 2 including:

means for storing a word length indicator with each data base and question word in the normal text lists of said words in said first and third storage locations.

4. A system as set forth in claim 1 wherein each of said question words is assigned a special question logic indicator pertinent to that particular word, including:

means responsive to said logic indicators for storing the results of a particular search in a predetermined portion of said fifth storage area ascertainable from said logic indicator.

5. A system as set forth in claim 4 including:

means for storing the logic indicator pertinent to each question word with the relative address of that word, and means for examining said fifth storage location before proceeding with a search to ascertain if the logic has previously been satisfied.

6. An Information Retrieval system as set forth in claim 1 including:

means for searching adjacent question word groups or STRINGS in said data base, said means comprising:

means for extracting and comparing question words and data base words in alphabetical order until the first word of said adjacent question word group comprising said STRING is found, means responsive to the detection of a successful comparison against said first word of said STRING for switching control of the accessing of both question and data base words to the normal text areas of the system in said first and third storage system areas, means for continuing the search in said storage locations until either a complete STRING is found or it is determined that a STRING mis-match exists, and means for returning the system control back to said alphabetized lists of question and data words upon said successful or unsuccessful completion of the STRING search.

7. An Information Retrieval system as set forth in claim 1 wherein said means to determine a successful search includes:

means for comparing a predetermined number of desired word and word group matches with a number ascertained from said fifth system storage area representative of the number of word and word group matches actually found in said data base.

8. An Information Retrieval system as set forth in claim 7 wherein said means to determine a successful search includes:

means responsive to the locating of a particular word or word group effective to render a complete answer indication for a particular search question.

9. An Information Retrieval system for searching a large data base in accordance with prescribed questions, said data base and questions being made up of alphanumeric words, wherein said data base is stored in said machine in a first and second storage location, said first storage location containing a list of the alphabetized relative addresses for all of the words in said data base and said second storage location containing said data base words stored in their original normal text order, a question list for said system stored in a third and fourth storage location, an alphabetized list of the relative addresses of the words in a given question being stored in said third storage location and a list of the question words in their original normal text order being stored in said fourth storage location, the addresses stored in said first and third storage locations being operable to access the particular words in said second and fourth storage locations, respectively, said system further having a fifth storage location for storing the results of individual searches, means for consecutively extracting question word addresses from the third storage location, means utilizing these addresses for extracting question words from said fourth storage location, means for extracting consecutive addresses from said first storage location, means for extracting data base words utilizing said last named addresses from said second storage location, means for comparing the words extracted from the second and fourth storage location, means for indicating the result of a comparison in said fifth storage location, means for continuing the access of question words and data words until the last question word has been accessed, and means for examining said fifth storage location to determine the degree of success of the search for the question word group against the data base.

10. A system as set forth in claim 9 wherein a word length indicator is stored in said second and fourth machine storage locations with each word of said data base list and said question word list, and means for initially comparing the word length indicators for a given question and data base word before proceeding with subsequent word comparisons to determine if the words are of the same length.

11. A system as set forth in claim 10 above wherein said comparison means includes:

means for extracting a new question word if it is determined that the data base word is longer than the particular question word being compared and for extracting a new data base word if it is determined that the particular data base word is shorter than the question word currently being compared.

12. An Information Retrieval system as set forth in claim 11 including:

means for comparing the individual characters of a question and data base word serially from the beginning thereof and for gating out a new question or data base word depending upon the first detected mis-match whereby a new data base word is accessed when it is determined that the first mis-match character occurs because the question word character is furthest along in the alphabet and a new question word is accessed when it is determined that the first mis-match character occurs because the data base word character is furthest along in the alphabet.

13. An Information Retrieval system as set forth in claim 12 wherein a special logic indicator is assigned to each question word and said indicator is physically stored in said third storage location with the relative address of the word to which said indicator relates, including:

means for extracting and detecting the logic indicator for each question word as a new question word address is extracted from said third machine storage location.

14. An Information Retrieval system as set forth in claim 13 including:

means for determining an address in said fifth storage location from said logic indicator.

15. An Information Retrieval system as set forth in claim 14 including:

means for storing an indication in said fifth memory storage location at each address indicated by every logic indicator used that a particular logic operation must be satisfied by the data base in order for the search to be considered successful.

16. An Information Retrieval system as set forth in claim 15 including:
  means for accessing said storage location in said fifth storage area specified by said logic indicator, and
  means for examining the information stored thereat to determine whether the logic indicated for the particular word being examined has been previously satisfied.

17. An Information Retrieval system as set forth in claim 16 including:
  means for detecting when a particular question word is the first word of a word adjacency group,
  means effective upon the detection of this word in the data base to transfer accessing control of both the data base and question words from the relative address list stored in the first and third sections of said memory respectively to the direct sequential accessing of said data base and question words from the second and fourth machine storage locations respectively where said words are consecutively stored in their normal text format, and
  means effective to return control of the accessing of said words to said third and first storage areas upon the termination of a word adjacency search whether successful or unsuccessful.

18. An Information Retrieval system as set forth in claim 17 wherein the means for determining the success of a word adjacency search comprises:
  means for keeping track of the number of successful word comparisons of the question words against the data base words at a predetermined location in said fifth system storage area,
  means for comparing this number with a number prescribed for the word adjacency test,
  means responsive to a successful comparison to store such result in said predetermined fifth system storage location, and
  means to return the system to the accessing of question and data base words under the control of the third and first sections of memory respectively containing the alphabetized lists of relative addresses.

19. An Information Retrieval system as set forth in claim 18 wherein the first and third system storage areas containing the alphabetized list of relative addresses for both the data base words and question words and also the associated logic indicators for the question words comprise a word addressable memory including:
  means for accessing a question word containing the complete address and associated logic operator in parallel,
  said second and fourth system storage areas containing the original text data base and question words comprise a serial by character addressable memory including:
  means for accessing the question and data base words a character at a time and wherein,
  said fifth system storage area comprises an additional portion of said word addressable memory.

20. An Information Retrieval system as set forth in claim 19 wherein all of the said memories together with their associated address and Data Registers and the system compare circuits necessary for comparing the data and question words and for decoding the logic operators function under control of a System Clock,
  said clock having a plurality of branch points therein, and
  means responsive to particular logic operations called for the results of word comparisons and logic interrogations made during the course of a search routine to cause branching of said System Clock.

21. An Information Retrieval system as set forth in claim 20 including:
  means for detecting the end of a question word group,
  means for interrogating that portion of said fifth system storage area relating to the particular question word group just completed, and
  means for detecting from said examination whether a successful interrogation of the particular data base relative to the question word group has occurred.

22. An Information Retrieval system as set forth in claim 21 wherein the means for determining whether a successful search has been completed comprises:
  means for interrogating each storage location in said fifth system storage area related to each logic indicator utilized in said question, and
  means for determining whether one or more successful matches indicated in such storage area indicates a successful search.

23. An Information Retrieval system as set forth in claim 22 wherein said means to determine a successful search includes:
  means for comparing a predetermined number of desired word and word group matches with a number ascertained from said fifth system storage area representative of the number of word and word group matches actually found in said data base.

24. An Information Retrieval system as set forth in claim 23 wherein said means to determine a successful search includes:
  means responsive to the locating of a particular word or word group effective to render a complete answer indication for a particular search question.

References Cited

UNITED STATES PATENTS

| | | | |
|---|---|---|---|
| 3,030,609 | 4/1962 | Albrecht | 340—172.5 |
| 3,234,522 | 2/1966 | Armstrong et al. | 340—172.5 |
| 3,241,125 | 3/1966 | Tomasulo et al. | 340—172.5 |
| 3,243,783 | 3/1966 | Rabenda et al. | 340—172.5 |
| 3,261,000 | 7/1966 | Behnke | 340—172.5 |
| 3,270,324 | 8/1966 | Meade et al. | 340—172.5 |
| 3,273,130 | 9/1966 | Baskin et al. | 340—172.5 |
| 3,293,615 | 12/1966 | Mullery et al. | 340—172.5 |

ROBERT C. BAILEY, *Primary Examiner.*

PAUL J. HENON, *Examiner.*